(12) United States Patent
Abedini et al.

(10) Patent No.: US 10,917,919 B2
(45) Date of Patent: Feb. 9, 2021

(54) REFERENCE SIGNAL DESIGN FOR MEDIUM ACCESS IN CELLULAR V2X COMMUNICATION

(71) Applicant: QUALCOMM Incorporated, San Diego, CA (US)

(72) Inventors: Navid Abedini, Somerset, NJ (US); Zhibin Wu, Sunnyvale, CA (US); Kapil Gulati, Hillsborough, NJ (US); Sudhir Kumar Baghel, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/413,763

(22) Filed: May 16, 2019

(65) Prior Publication Data

US 2019/0373633 A1    Dec. 5, 2019

Related U.S. Application Data

(60) Provisional application No. 62/678,971, filed on May 31, 2018.

(51) Int. Cl.
*H04W 74/08* (2009.01)
*H04W 72/10* (2009.01)
*H04W 72/04* (2009.01)

(52) U.S. Cl.
CPC ..... *H04W 74/085* (2013.01); *H04W 72/0446* (2013.01); *H04W 72/10* (2013.01)

(58) Field of Classification Search
None
See application file for complete search history.

(56) References Cited

U.S. PATENT DOCUMENTS

| 6,556,582 B1 | 4/2003 | Redi |
| 8,675,544 B1* | 3/2014 | Hirsch ................ H04B 7/2656 370/322 |
| 9,002,282 B1* | 4/2015 | de la Broise ............ H04B 1/40 455/63.1 |

(Continued)

OTHER PUBLICATIONS

International Search Report and Written Opinion —PCT/US2019/032938—ISA/EPO—dated Jul. 8, 2019.

*Primary Examiner* — Chi H Pham
*Assistant Examiner* — Vladislav Y Agureyev
(74) *Attorney, Agent, or Firm* — Loza & Loza, LLP

(57) ABSTRACT

Aspects of the disclosure relate to methods and apparatus for scheduling traffic between a transmitting device and a receiving device. A transmitting device negotiates with a receiving device to reserve a slot for communicating data with the receiving device and determines whether the transmitting device is a master or a slave with respect to the receiving device. If the transmitting device is the master, the transmitting device sends, at a beginning of the slot, a transmission priority (TxP) signal, wherein the TxP signal indicates that the transmitting device intends and has priority to transmit the data in the slot. The transmitting device then receives, from the receiving device, a clear-to-send (CTS) message in the slot based on the TxP signal, and transmits the data to the receiving device in the slot upon receiving the CTS message. Other aspects, embodiments, and features are also claimed and described.

27 Claims, 15 Drawing Sheets

(56) References Cited

U.S. PATENT DOCUMENTS

| | | | |
|---|---|---|---|
| 2007/0014266 A1* | 1/2007 | Kondo | H04W 74/0858 370/337 |
| 2008/0175265 A1* | 7/2008 | Yonge | H04B 3/54 370/447 |
| 2009/0225779 A1 | 9/2009 | Diab et al. | |
| 2011/0002344 A1* | 1/2011 | Palin | H04L 49/9036 370/428 |
| 2012/0093177 A1* | 4/2012 | Champaney | H04W 74/0875 370/503 |
| 2014/0112233 A1* | 4/2014 | Bodas | H04W 72/1242 370/312 |
| 2014/0248866 A1* | 9/2014 | Itoh | H04W 24/02 455/418 |
| 2015/0049644 A1* | 2/2015 | Lee | H04W 84/20 370/256 |
| 2015/0201401 A1* | 7/2015 | Lahetkangas | H04W 28/26 370/329 |
| 2016/0128084 A1* | 5/2016 | Novlan | H04W 72/1268 370/329 |
| 2016/0150552 A1 | 5/2016 | Sadiq et al. | |
| 2016/0218819 A1* | 7/2016 | Yang | H04L 12/40045 |
| 2016/0302237 A1* | 10/2016 | Gupta | H04W 74/004 |
| 2016/0353485 A1* | 12/2016 | Wentink | H04W 72/14 |
| 2017/0041252 A1* | 2/2017 | Das | H04L 65/403 |
| 2018/0020461 A1* | 1/2018 | Tomeba | H04W 72/121 |
| 2018/0332602 A1* | 11/2018 | Lee | H04W 72/02 |
| 2018/0332660 A1* | 11/2018 | Mueck | H04W 48/10 |
| 2019/0059107 A1* | 2/2019 | Inoki | H04W 24/06 |
| 2019/0274165 A1* | 9/2019 | Pu | H04W 72/0446 |

\* cited by examiner

Half-duplex 1: Tx/Rx
802

Half-duplex 2: Self-Conflict
804

Deafness Problem
(Directivity Conflict)
806

Secondary Conflict
(Hidden Node)
852

Exposed Node
(Spatial Reuse)
854

REFERENCE SIGNAL DESIGN FOR MEDIUM ACCESS IN CELLULAR V2X COMMUNICATION

PRIORITY CLAIM

This application claims priority to and the benefit of U.S. Provisional Patent Application No. 62/678,971 filed on May 31, 2018, the entire content of which is incorporated herein by reference as if fully set forth below in its entirety and for all applicable purposes.

TECHNICAL FIELD

The technology discussed below relates generally to wireless communication systems, and more particularly, to scheduling traffic between a transmitter and a receiver.

INTRODUCTION

Cellular vehicle-to-everything (V2X) is a vehicular communication system enabling communications from a vehicle to any entity that may affect the vehicle, and vice versa. V2X may incorporate other more specific types of communication, e.g., vehicle-to-infrastructure (V2I), vehicle-to-vehicle (V2V), vehicle-to-pedestrian (V2P), vehicle-to-device (V2D), and vehicle-to-grid (V2G).

In 3GPP Release 14, LTE-based communication has been defined for a direct interface (e.g., PC5 interface) as well as for a network interface (e.g., Uu interface). Currently, V2V communication via the PC5 interface is broadcast. However, for later 3GPP releases (e.g. Release 16 and beyond), there is a need to establish unicast links between vehicles for advanced use cases. A use case for 1-to-1 or 1-to-many V2V link scenarios may involve the on-demand sharing of sensor data that cannot be supported over broadcast. Another use case may involve a see-through camera feed, such as when a first vehicle wishes to see in front of a second vehicle ahead of the first vehicle using the second vehicle's camera.

As the demand for unicast links between vehicles increases, solutions will be needed with respect to, for example, discovering whether another vehicle supports a unicast link service, initiating the setup of a unicast/multicast link, and establishing a long-term key as a basis to bootstrap link security.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods and apparatus for scheduling traffic between a transmitter and a receiver. A transmitter negotiates with a receiver to reserve a slot for communicating data with the receiver and determines whether the transmitter is a master or a slave with respect to the receiver. If the transmitter is the master, the transmitter sends, at a beginning of the slot, a transmission priority (TxP) signal, wherein the TxP signal indicates that the transmitter intends and has priority to transmit the data in the slot. The transmitter then receives, from the receiver, a clear-to-send (CTS) message in the slot based on the TxP signal, and transmits the data to the receiver in the slot upon receiving the CTS message. A receiver negotiates with a transmitter to reserve a slot for communicating data with the transmitter and determines whether the receiver is a master or a slave with respect to the transmitter. If the receiver is the slave, the receiver receives, at a beginning of the slot, a transmission priority (TxP) signal from the transmitter, wherein the TxP signal indicates that the transmitter intends and has priority to transmit the data in the slot. The receiver then sends a clear-to-send (CTS) message in the slot based on the TxP signal and receives the data from the transmitter in the slot based on the CTS message. Other aspects, embodiments, and features are also claimed and described.

In one example, a method for performed at a transmitter for scheduling traffic with a receiver is disclosed. The method includes negotiating with a receiver to reserve a slot for communicating data with the receiver, determining whether the transmitter is a master or a slave with respect to the receiver, if the transmitter is the master: sending, at a beginning of the slot, a transmission priority (TxP) signal, wherein the TxP signal indicates that the transmitter intends and has priority to transmit the data in the slot, and receiving, from the receiver, a clear-to-send (CTS) message in the slot based on the TxP signal, if the transmitter is the slave: monitoring to receive the TxP signal in the slot, sending a request-to-send (RTS) message if the TxP signal is not received, wherein the RTS message indicates that the transmitter intends to transmit the data in the slot, and receiving, from the receiver, the CTS message in the slot based on the RTS message, and transmitting the data to the receiver in the slot upon receiving the CTS message.

In another example, a transmitter for scheduling traffic with a receiver is disclosed. The transmitter includes means for negotiating with a receiver to reserve a slot for communicating data with the receiver, means for determining whether the transmitter is a master or a slave with respect to the receiver, if the transmitter is the master: means for sending, at a beginning of the slot, a transmission priority (TxP) signal, wherein the TxP signal indicates that the transmitter intends and has priority to transmit the data in the slot, and means for receiving, from the receiver, a clear-to-send (CTS) message in the slot based on the TxP signal, if the transmitter is the slave: means for monitoring to receive the TxP signal in the slot, means for sending a request-to-send (RTS) message if the TxP signal is not received, wherein the RTS message indicates that the transmitter intends to transmit the data in the slot, and means for receiving, from the receiver, the CTS message in the slot based on the RTS message, and means for transmitting the data to the receiver in the slot upon receiving the CTS message.

In a further example, a non-transitory computer-readable medium storing computer-executable code at a transmitter for scheduling traffic with a receiver, comprising code is disclosed. The code is for causing a computer to negotiate with a receiver to reserve a slot for communicating data with the receiver, determine whether the transmitter is a master or a slave with respect to the receiver, if the transmitter is the master: send, at a beginning of the slot, a transmission priority (TxP) signal, wherein the TxP signal indicates that the transmitter intends and has priority to transmit the data in the slot, and receive, from the receiver, a clear-to-send (CTS) message in the slot based on the TxP signal, if the transmitter is the slave: monitor to receive the TxP signal in the slot, send a request-to-send (RTS) message if the TxP signal is not received, wherein the RTS message indicates that the transmitter intends to transmit the data in the slot, and receive, from the receiver, the CTS message in the slot based on the RTS message, and transmit the data to the receiver in the slot upon receiving the CTS message.

In yet another example, a transmitter for scheduling traffic with a receiver is disclosed. The transmitter includes a processor, a transceiver communicatively coupled to the at least one processor, and a memory communicatively coupled to the at least one processor. The at least one processor is configured to negotiate with a receiver to reserve a slot for communicating data with the receiver, determine whether the transmitter is a master or a slave with respect to the receiver, if the transmitter is the master: send, at a beginning of the slot, a transmission priority (TxP) signal, wherein the TxP signal indicates that the transmitter intends and has priority to transmit the data in the slot, and receive, from the receiver, a clear-to-send (CTS) message in the slot based on the TxP signal, if the transmitter is the slave: monitor to receive the TxP signal in the slot, send a request-to-send (RTS) message if the TxP signal is not received, wherein the RTS message indicates that the transmitter intends to transmit the data in the slot, and receive, from the receiver, the CTS message in the slot based on the RTS message, and transmit the data to the receiver in the slot upon receiving the CTS message.

In one example, a method performed at a receiver for scheduling traffic with a transmitter is disclosed. The method includes negotiating with a transmitter to reserve a slot for communicating data with the transmitter, determining whether the receiver is a master or a slave with respect to the transmitter, if the receiver is the slave: receiving, at a beginning of the slot, a transmission priority (TxP) signal from the transmitter, wherein the TxP signal indicates that the transmitter intends and has priority to transmit the data in the slot, and sending a clear-to-send (CTS) message in the slot based on the TxP signal, refraining from sending a request-to-send (RTS) message in the slot after receiving the TxP signal, if the receiver is the master: refraining from sending the TxP signal if no data is to be transmitted by the receiver in the slot, receiving, from the transmitter, a request-to-send (RTS) message in the slot, wherein the RTS message indicates that the transmitter intends to transmit the data in the slot, and sending the CTS message in the slot based on the RTS message, and receiving the data from the transmitter in the slot based on the CTS message.

In another example, a receiver for scheduling traffic with a transmitter is disclosed. The receiver includes means for negotiating with a transmitter to reserve a slot for communicating data with the transmitter, means for determining whether the receiver is a master or a slave with respect to the transmitter, if the receiver is the slave: means for receiving, at a beginning of the slot, a transmission priority (TxP) signal from the transmitter, wherein the TxP signal indicates that the transmitter intends and has priority to transmit the data in the slot, and means for sending a clear-to-send (CTS) message in the slot based on the TxP signal, means for refraining from sending a request-to-send (RTS) message after receiving the TxP signal, and means for receiving the data from the transmitter in the slot based on the CTS message.

In a further example, a non-transitory computer-readable medium storing computer-executable code at a receiver for scheduling traffic with a transmitter, comprising code is disclosed. The code is for causing a computer to negotiate with a transmitter to reserve a slot for communicating data with the transmitter, determine whether the receiver is a master or a slave with respect to the transmitter, if the receiver is the slave: receive, at a beginning of the slot, a transmission priority (TxP) signal from the transmitter, wherein the TxP signal indicates that the transmitter intends and has priority to transmit the data in the slot, and send a clear-to-send (CTS) message in the slot based on the TxP signal, refrain from sending a request-to-send (RTS) message after receiving the TxP signal, and receive the data from the transmitter in the slot based on the CTS message.

In yet another example, a receiver for scheduling traffic with a transmitter is disclosed. The receiver includes a processor, a transceiver communicatively coupled to the at least one processor, and a memory communicatively coupled to the at least one processor. The at least one processor is configured to negotiate with a transmitter to reserve a slot for communicating data with the transmitter, determine whether the receiver is a master or a slave with respect to the transmitter, if the receiver is the slave: receive, at a beginning of the slot, a transmission priority (TxP) signal from the transmitter, wherein the TxP signal indicates that the transmitter intends and has priority to transmit the data in the slot, and send a clear-to-send (CTS) message in the slot based on the TxP signal, refrain from sending a request-to-send (RTS) message after receiving the TxP signal, and receive the data from the transmitter in the slot based on the CTS message.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
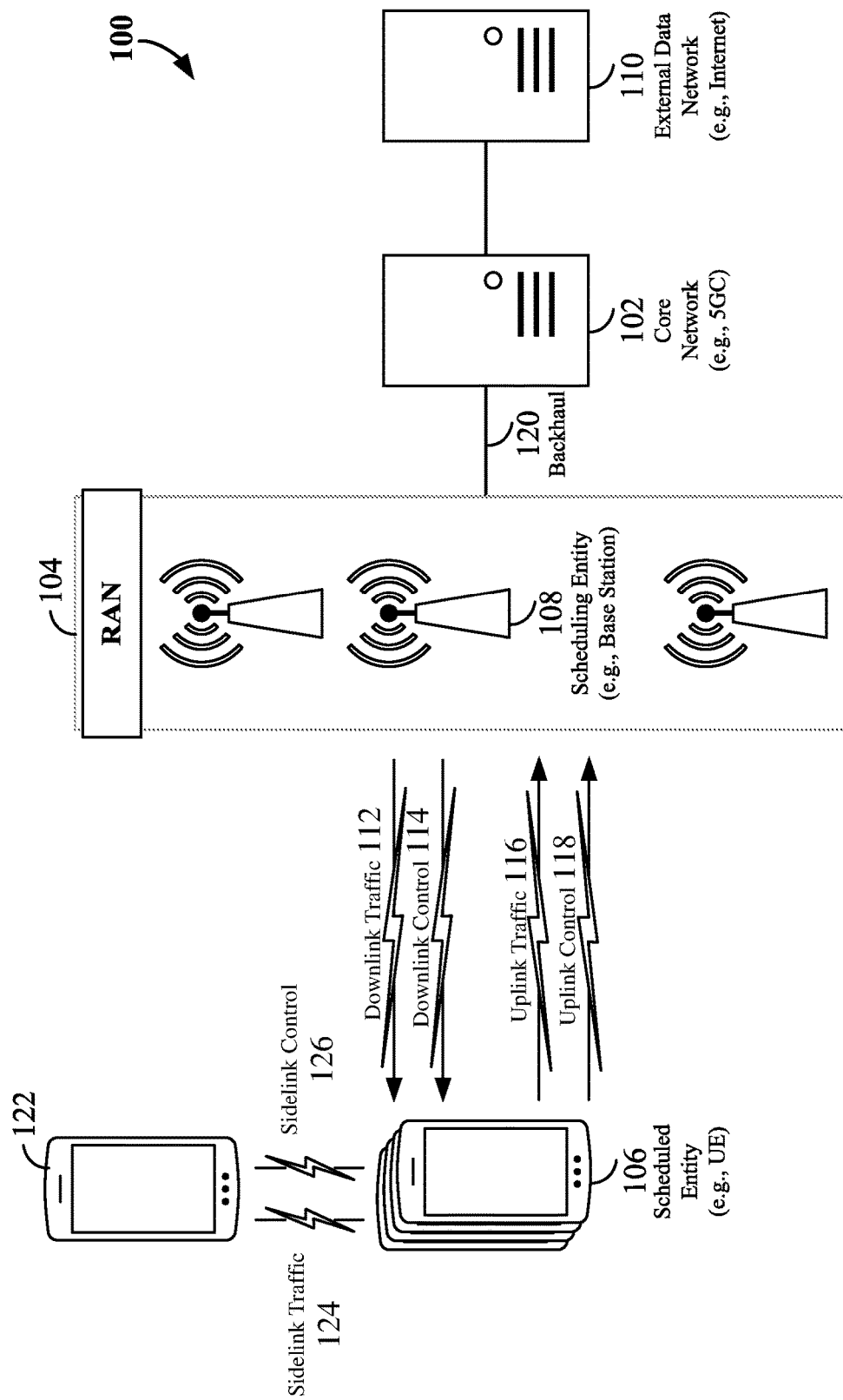
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure relate to methods and apparatus for scheduling traffic between a transmitter and a receiver. A transmitter negotiates with a receiver to reserve a slot for communicating data with the receiver and determines whether the transmitter is a master or a slave with respect to the receiver. If the transmitter is the master, the transmitter sends, at a beginning of the slot, a transmission priority (TxP) signal, wherein the TxP signal indicates that the transmitter intends and has priority to transmit the data in the slot. The transmitter then receives, from the receiver, a clear-to-send (CTS) message in the slot based on the TxP signal, and transmits the data to the receiver in the slot upon receiving the CTS message. A receiver negotiates with a transmitter to reserve a slot for communicating data with the transmitter and determines whether the receiver is a master or a slave with respect to the transmitter. If the receiver is the slave, the receiver receives, at a beginning of the slot, a transmission priority (TxP) signal from the transmitter, wherein the TxP signal indicates that the transmitter intends and has priority to transmit the data in the slot. The receiver then sends a clear-to-send (CTS) message in the slot based on the TxP signal and receives the data from the transmitter in the slot based on the CTS message. Other aspects, embodiments, and features are also claimed and described.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
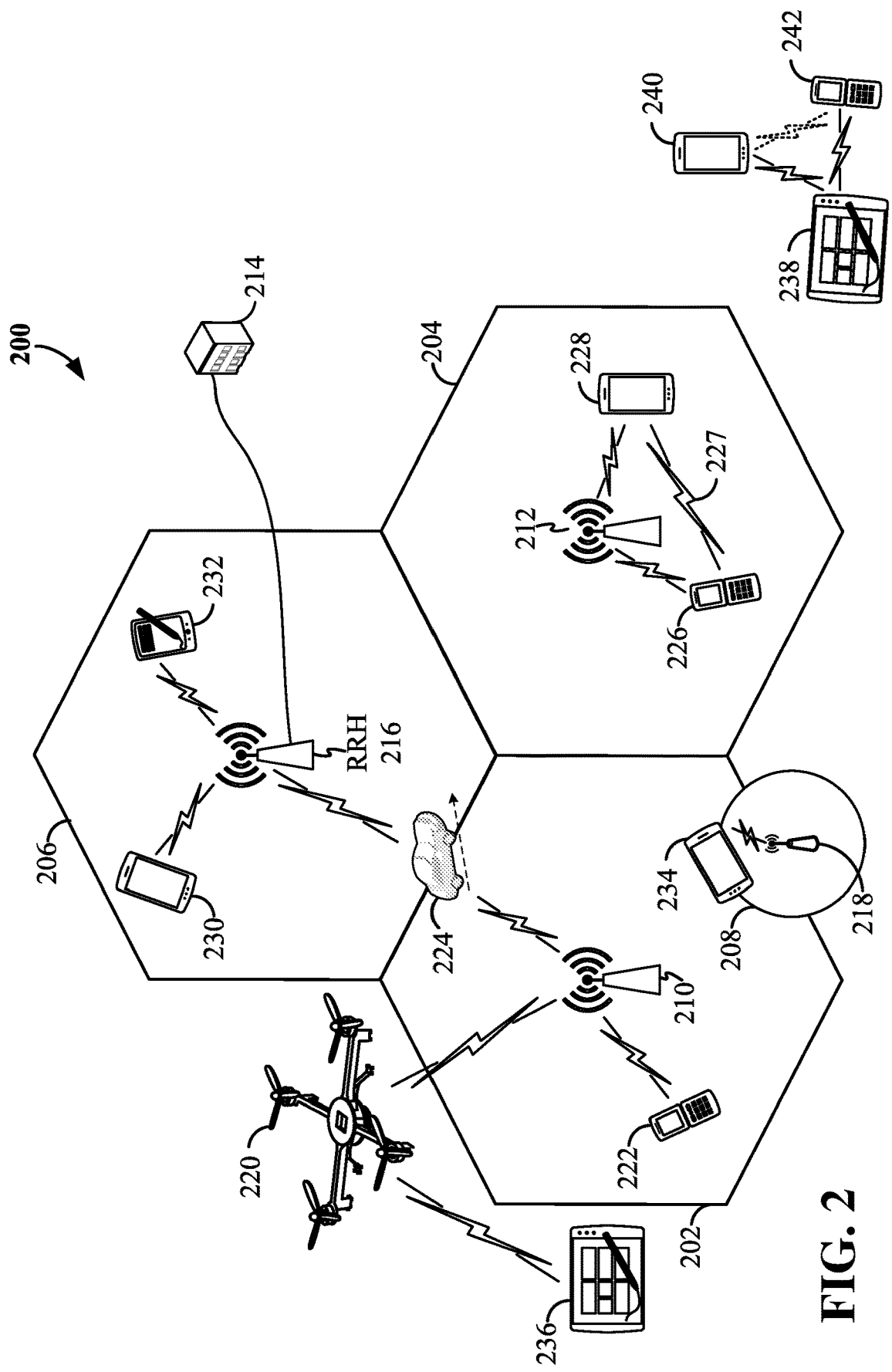
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, scheduled entities such as a first scheduled entity 106 and a second scheduled entity 122 may utilize sidelink signals for direct D2D communication. Sidelink signals may include sidelink traffic 124 and sidelink control 126. Sidelink control information 126 may in some examples include a request signal, such as a request-to-send (RTS), a source transmit signal (STS), and/or a direction selection signal (DSS). The request signal may provide for a scheduled entity 106 to request a duration of time to keep a sidelink channel available for a sidelink signal. Sidelink control information 126 may further include a response signal, such as a clear-to-send (CTS) and/or a destination receive signal (DRS). The response signal may provide for the scheduled entity 106 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 124.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
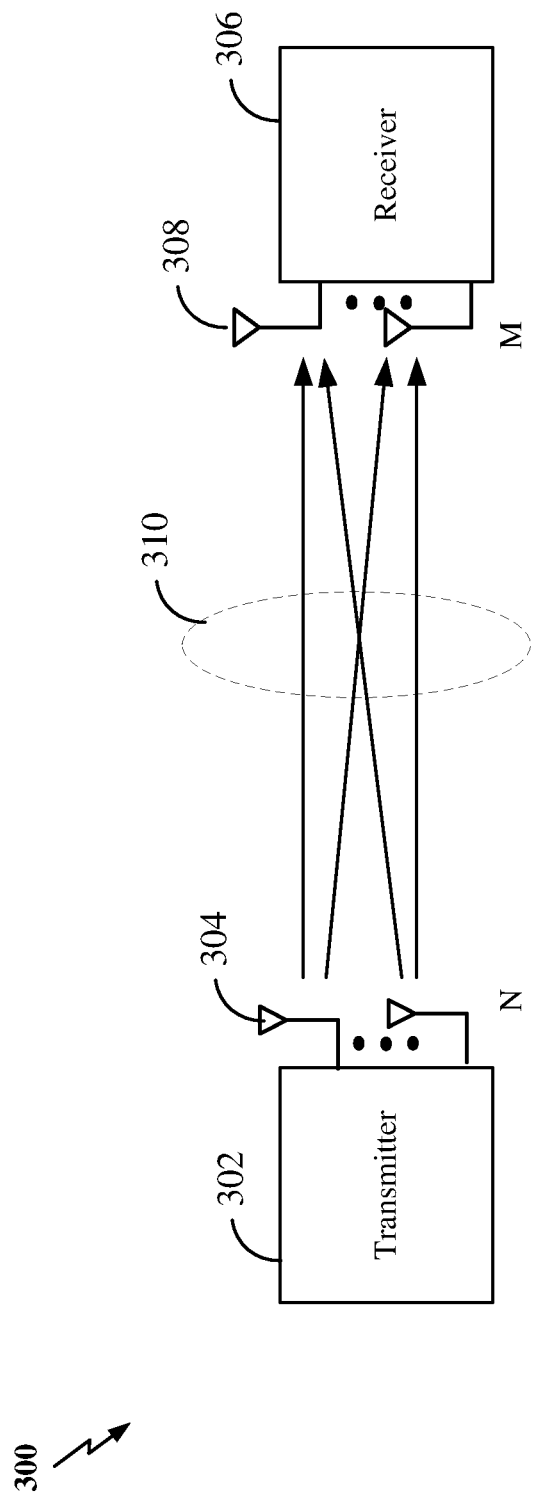
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
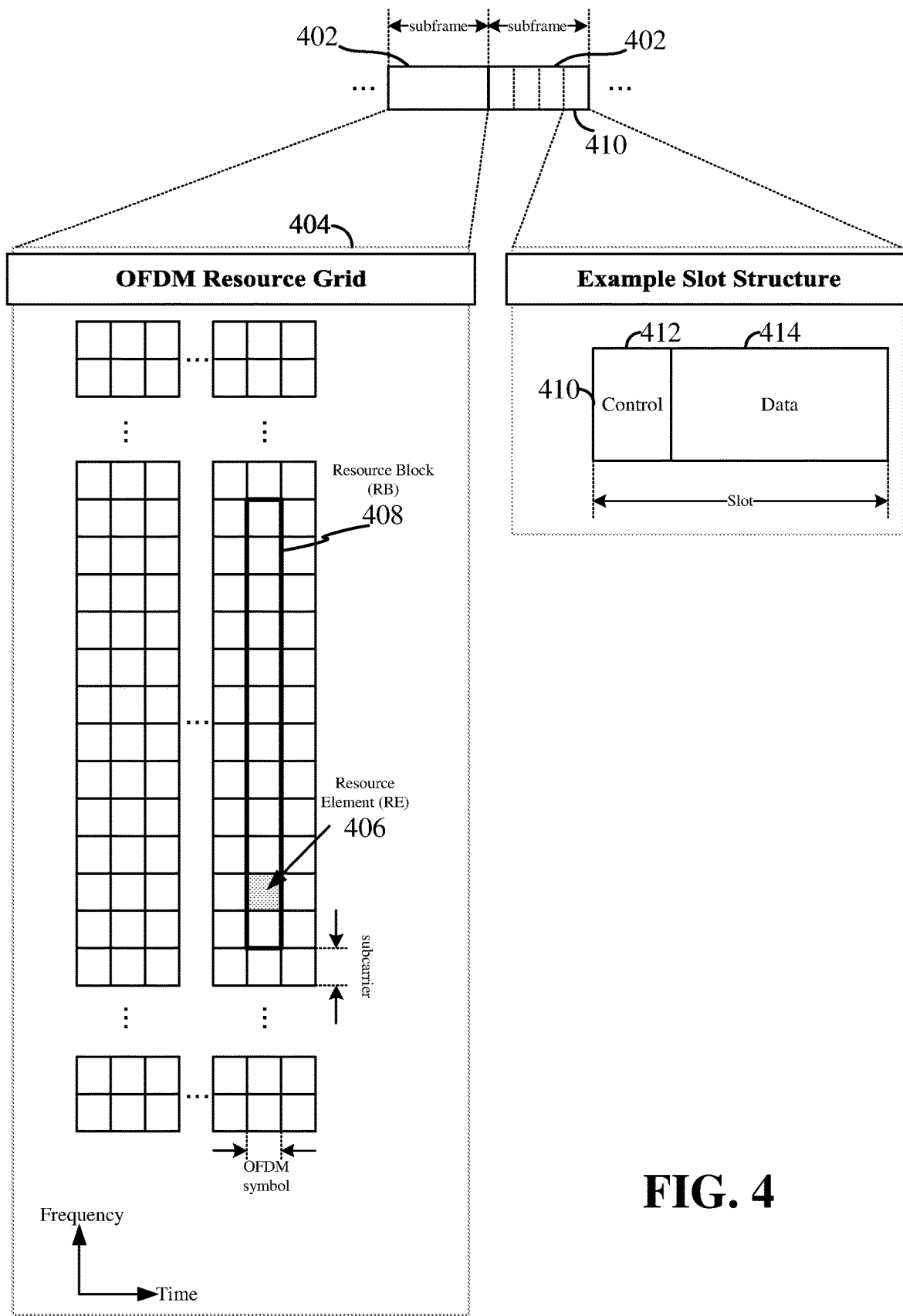
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the scheduled entity 106) may utilize one or more REs 406 to carry UL control information 118 originating from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
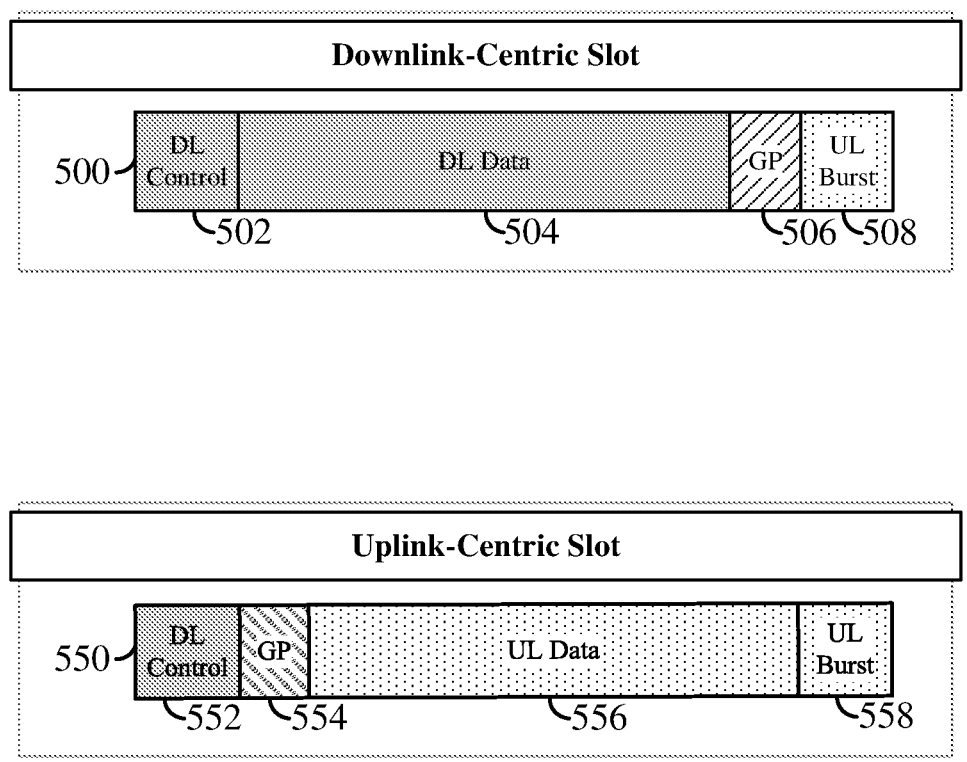
FIG. 5 is a schematic illustration of exemplary self-contained slots according to some aspects of the disclosure.

According to an aspect of the disclosure, one or more slots may be structured as self-contained slots. For example, FIG. 5 illustrates two example structures of self-contained slots 500 and 550. The self-contained slots 500 and/or 550 may be used, in some examples, in place of the slot 410 described above and illustrated in FIG. 4.

In the illustrated example, a DL-centric slot 500 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 550 may be a receiver-scheduled slot, wherein more resources are allocated for transmissions in the UL direction (e.g., transmissions from the scheduled entity 106 to the scheduling entity 108).

Each slot, such as the self-contained slots 500 and 550, may include transmit (Tx) and receive (Rx) portions. For example, in the DL-centric slot 500, the scheduling entity 202 first has an opportunity to transmit control information, e.g., on a PDCCH, in a DL control region 502, and then an opportunity to transmit DL user data or traffic, e.g., on a PDSCH in a DL data region 504. Following a guard period (GP) region 506 having a suitable duration, the scheduling entity 108 has an opportunity to receive UL data and/or UL feedback including any UL scheduling requests, CSF, a HARQ ACK/NACK, etc., in an UL burst 508 from other entities using the carrier. Here, a slot such as the DL-centric slot 500 may be referred to as a self-contained slot when all of the data carried in the data region 504 is scheduled in the control region 502 of the same slot; and further, when all of the data carried in the data region 504 is acknowledged (or at least has an opportunity to be acknowledged) in the UL burst 508 of the same slot. In this way, each self-contained slot may be considered a self-contained entity, not necessarily requiring any other slot to complete a scheduling-transmission-acknowledgment cycle for any given packet.

The GP region 506 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 108. Accordingly, the GP region 506 may allow an amount of time after the DL data region 504 to prevent interference, where the GP region 506 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 550 may be configured as a self-contained slot. The UL-centric slot 550 is substantially similar to the DL-centric slot 500, including a guard period 554, an UL data region 556, and an UL burst region 558.

The slot structure illustrated in slots 500 and 550 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 6:
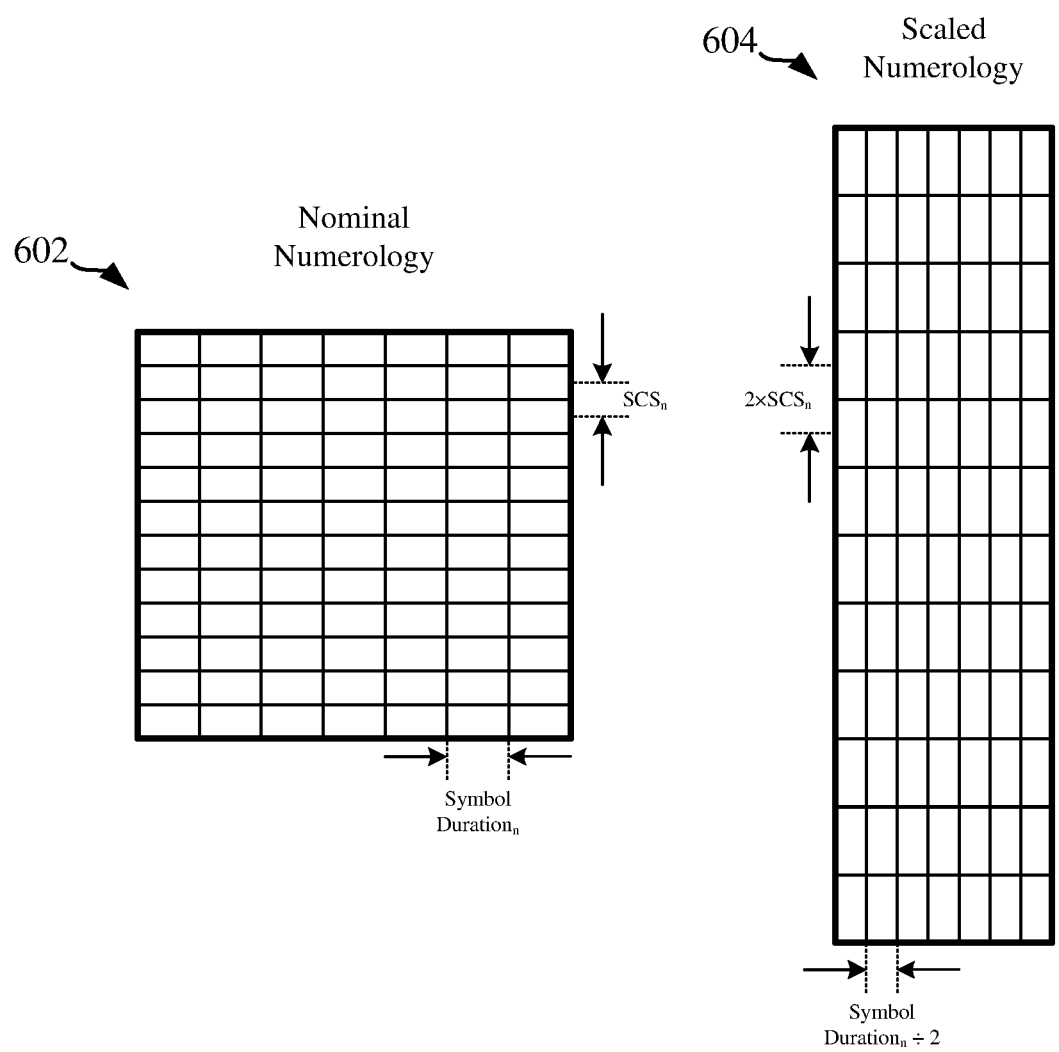
FIG. 6 is a schematic illustration of an OFDM air interface utilizing a scalable numerology according to some aspects of the disclosure.

To illustrate this concept of a scalable numerology, FIG. 6 shows a first RB 602 having a nominal numerology, and a second RB 604 having a scaled numerology. As one example, the first RB 602 may have a 'nominal' subcarrier spacing ($SCS_n$) of 30 kHz, and a 'nominal' symbol duration$_n$ of 333 µs. Here, in the second RB 604, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 604, the scaled numerology includes a scaled symbol duration of half the nominal symbol duration, or (symbol duration$_n$)÷2=167 µs.

Figure 7:
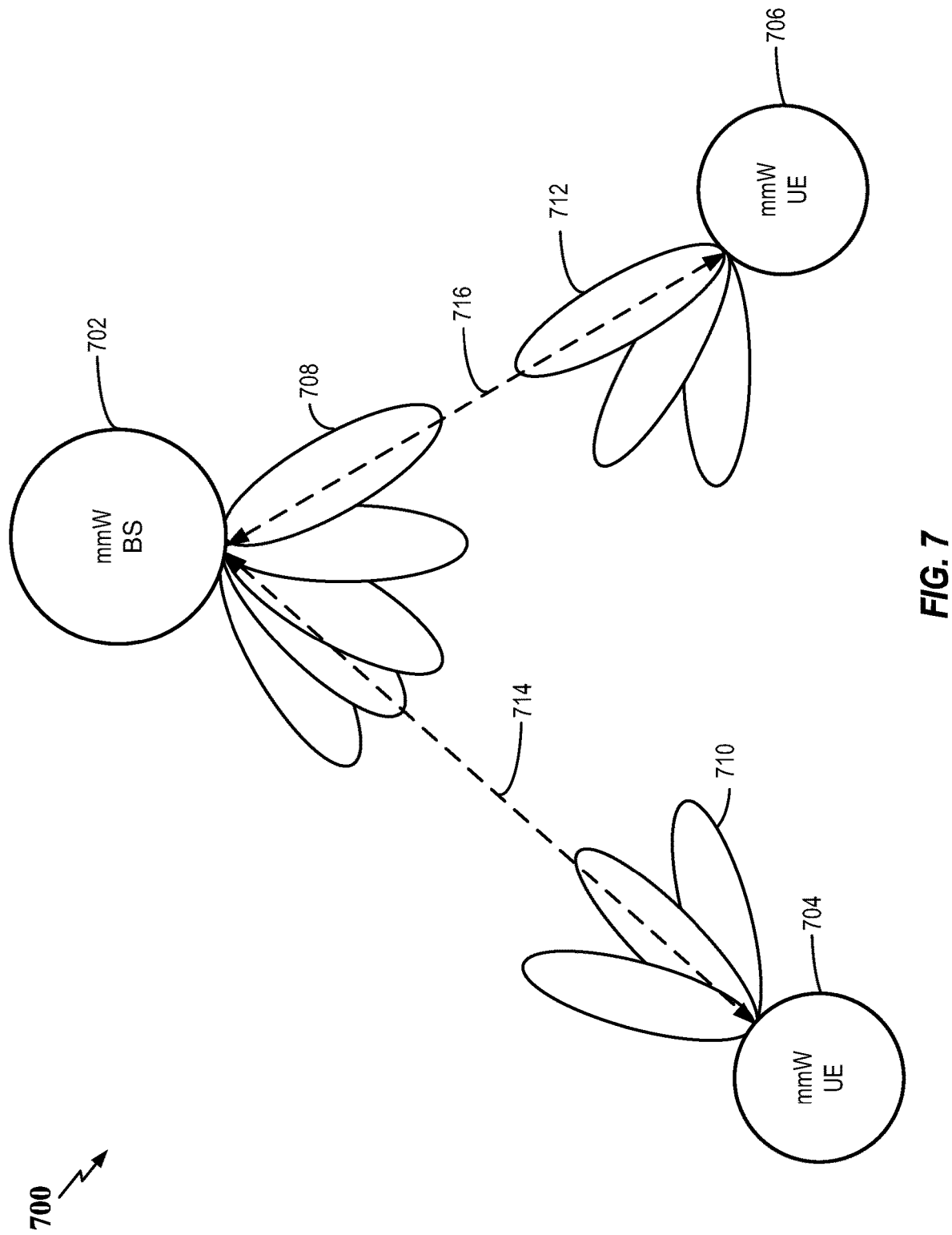
FIG. 7 illustrates a communication system where a mmWave base station communicates with a first mmWave UE and a second mmWave UE via different beamforming directions.

FIG. 7 illustrates a communication system 700 where a millimeter-wave (mmWave) base station (BS) (or gNB) 702 communicates with a first mmWave user equipment (UE) 704 and a second mmWave UE 706 via different beamforming directions. As indicated by a set of beams 708, the mmWave base station 702 may communicate via any one of a plurality of directional beams. As indicated by a set of beams 710, the first mmWave UE 704 may communicate via any one of a plurality of directional beams. As indicated by a set of beams 712, the second mmWave UE 706 may communicate via any one of a plurality of directional beams. For example, the base station 702 may communicate with the first mmWave UE 704 via a first beamforming direction 714 and communicate with the second mmWave UE 706 via a second beamforming direction 716.

Aspects of the present disclosure relate to traffic scheduling in a millimeter-wave (mmWave)-based vehicle-to-everything (V2X) communication system. A mmWave generally refers to high bands above 24 GHz, which can provide a very large bandwidth. In order to perform a mmWave-based transmission, a direction of transmission between a transmitter and a receiver is needed. However, problems may occur when scheduling the mmWave-based transmission for a V2X scenario. For example, if many nodes (e.g., UEs) are present, all nodes cannot communicate with each other at the same time because such communication will cause interference. Accordingly, an aspect of the present disclosure provides a two-tier solution for scheduling traffic in a mmWave-based V2X system. A first tier of the solution relates to slow-loop booking while a second tier relates to fast-loop scheduling.

In slow-loop booking, a peer node may negotiate pairwise booking with a particular peer node so that the two peers may agree to engage with each other (i.e., transmit/receive information with each other) during a certain time and in a certain direction. Essentially, slow-loop booking allows a peer node (e.g., peer UE) to understand in the long-term where another peer node (e.g., another peer UE) will be available to listen for a transmission, and in what direction the other peer UE will be listening. In an aspect, UEs may negotiate with each other a time where each UE will be transmitting and/or listening. For example, a first UE may indicate to a second UE that the first UE will be transmitting in a first set of subframes and listening in a second set of subframes. Accordingly, if the second UE wishes to transmit information to the first UE, the second UE should do so in a subframe where the first UE will be listening. In a further aspect, the UEs may also negotiate a direction of transmission. For example, the first UE may indicate to the second UE that the first UE will be listening in a first direction during a first subframe and transmitting in a second direction in a second subframe. As such, slow-loop booking may resolve primary conflict issues, as will be described below.

However, slow-loop booking may not resolve issues regarding interference among links. Rather, fast-loop scheduling may deal with interference issues with respect to other links and self-conflict in a particular direction. Interference may occur when different links book the same resource for communication, but not necessarily in the same direction.

For example, to cause interference, a node of one link just has to be close enough to another link such that the node's transmission causes interference on the other link. The node's transmission does not need to exactly align with the communication direction of the other link to cause interference. Rather, the node's transmission just needs to degrade a signal-to-interference-and-noise ratio (SINR) at a receiving node of the other link.

Figure 8:
FIG. 8 illustrates diagrams describing primary scheduling conflicts for one or more nodes and diagrams describing inter-link issues.
Figure 8:
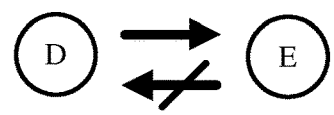
Figure 8:
Figure 8:
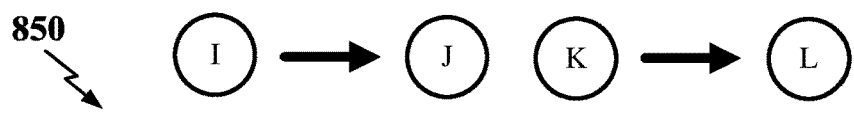
Figure 8:
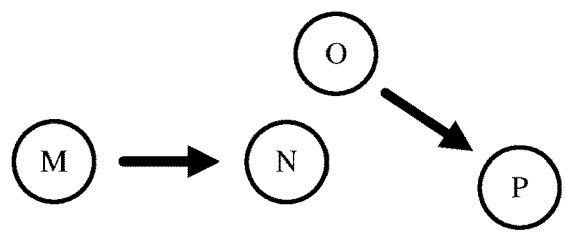

FIG. 8 illustrates diagrams 800 describing primary scheduling conflicts for one or more nodes (UEs) and diagrams 850 describing inter-link issues. In an aspect, not all scheduling conflicts can be sensed by nodes due to use of a directional beam. Referring to the diagrams 850, in a first half duplex scenario 802, a primary conflict may occur when a first UE (e.g., UE A) cannot communicate with a second UE (e.g., UE B) while the second UE communicates with a third party (e.g., UE C) in a different direction. In a second half duplex scenario 804, a primary conflict may occur when a first UE (e.g., UE D) cannot receive a transmission from a second UE (e.g., UE E) when the second UE is transmitting to the first UE while the first UE is transmitting to the second UE. In a deaf scenario 806, a primary conflict may occur when a UE (e.g., UE F) cannot simultaneously receive two different directional beams (e.g., transmitted from UEs G and H).

Referring to the diagrams 850, inter-link issues will be described. Here, a first node (e.g., UE I) and a second node (e.g., UE J) are in an established link (first link). Moreover, a third node (e.g., UE K) and a fourth node (e.g., UE L) are in another established link (second link). In a secondary conflict (hidden node) scenario 852, an inter-link issue may occur when a node of one link is close enough to another link such that the node's transmission causes interference on the other link. For example, in the hidden node scenario 852, the UE L may be close enough to the first link (between the UE I and the UE J) such that the UE I's transmission to the UE J may cause interference on the UE L's reception of a transmission from the UE K. In an exposed node (spatial reuse) scenario 854, an inter-link issue may occur when different links book the same resource for communication. For example, in the spatial reuse scenario 854, the UE O may transmit information to the UE P using the same resources used by the UE M for transmitting information to the UE N.

In an aspect, a slow-loop booking schedule may me filled with pairwise slot reservations between a UE and its neighboring UEs. Each reserved slot may be valid for transmitting in both directions (e.g., transmitting from a first UE to a second UE and transmitting from the second UE to the first UE). That is, a slot may be bi-directionally booked, but may actually be used to communicate information in one direction or both directions. Slow-loop booking is not driven by data, and therefore, may experience efficiency loss when reserved slots end up not being used. In an aspect, slow-loop booking resolves primary conflict and deafness issues described above. Slow-loop booking may co-exist with another link (without common endpoints).

Figure 9:
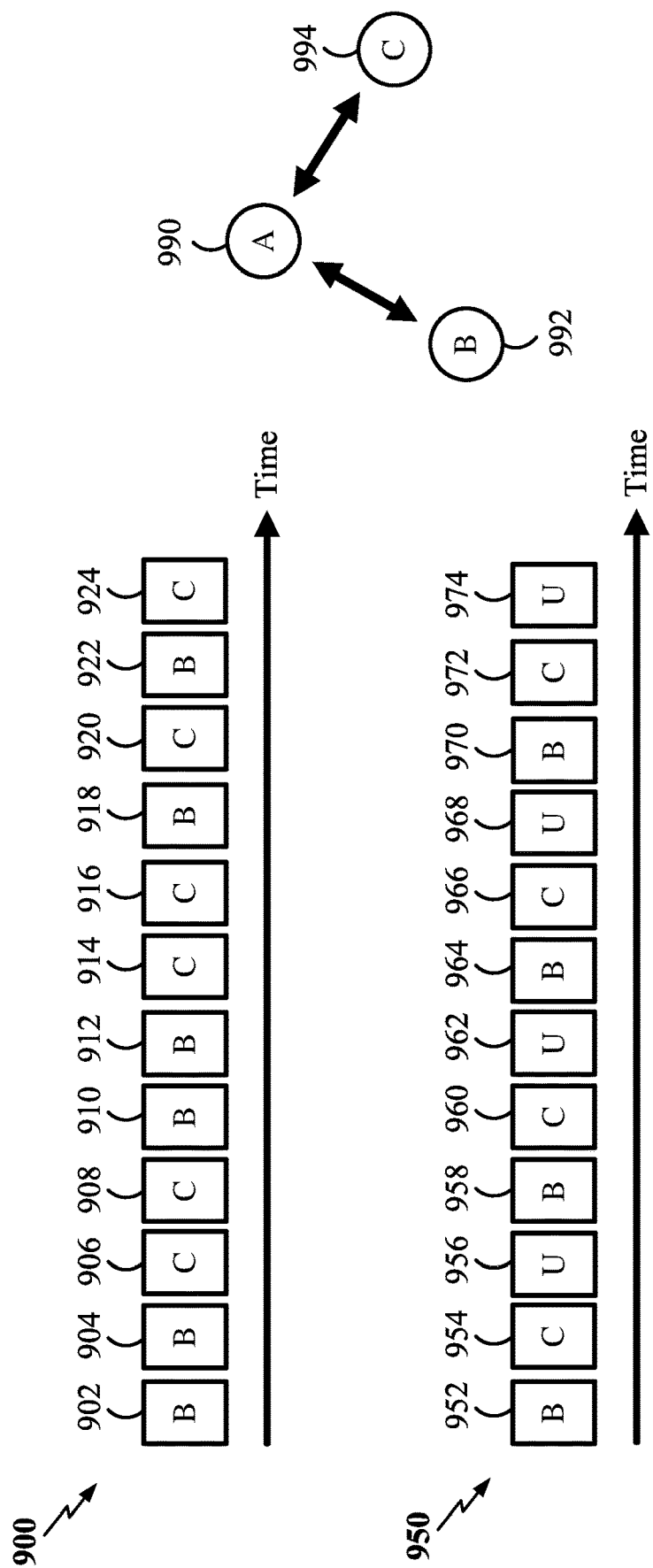
FIG. 9 illustrates examples of high level slow-loop booking schedules of a node.

FIG. 9 illustrates examples of high level slow-loop booking schedules of a node. In the high level booking schedule examples, a first UE (UE A) 990 may negotiate pairwise slot reservations with a second UE (UE B) 992 and a third UE (UE C) 994 over a number of slots (e.g., 12 slots). As shown in a first booking schedule example 900, the first UE (UE A) 990 may reserve a first slot 902, a second slot 904, a fifth slot 910, a sixth slot 912, a ninth slot 918, and an eleventh slot 922 to communicate with the second UE (UE B) 992. The slot booking may be bi-directional. Therefore, the reserved slots are valid for transmissions from the first UE (UE A) 990 to the second UE (UE B) 992 as well as transmissions from the second UE (UE B) 992 to the first UE (UE A) 990. Also in the first booking schedule example 900, the first UE (UE A) 990 may reserve a third slot 906, a fourth slot 908, a seventh slot 914, an eighth slot 916, a tenth slot 920, and a twelfth slot 924 to communicate with a third UE (UE C) 994. Again, the slot booking may be bi-directional. Therefore, the reserved slots are valid for transmissions from the first UE (UE A) 990 to the third UE (UE C) 994 as well as transmissions from the third UE (UE C) 994 to the first UE (UE A) 990.

As shown in a second booking schedule example 950, the first UE (UE A) 990 may bi-directionally reserve a first slot 952, a fourth slot 958, a seventh slot 964, and a tenth slot 970 to communicate with the second UE (UE B) 992 and bi-directionally reserve a second slot 954, a fifth slot 960, an eighth slot 966, and an eleventh slot 972 to communicate with the third (UE C) 994. A third slot 956, a sixth slot 962, a ninth slot 968, and a twelfth slot 974 may be left unused or unreserved as denoted by "U".

Figure 10:
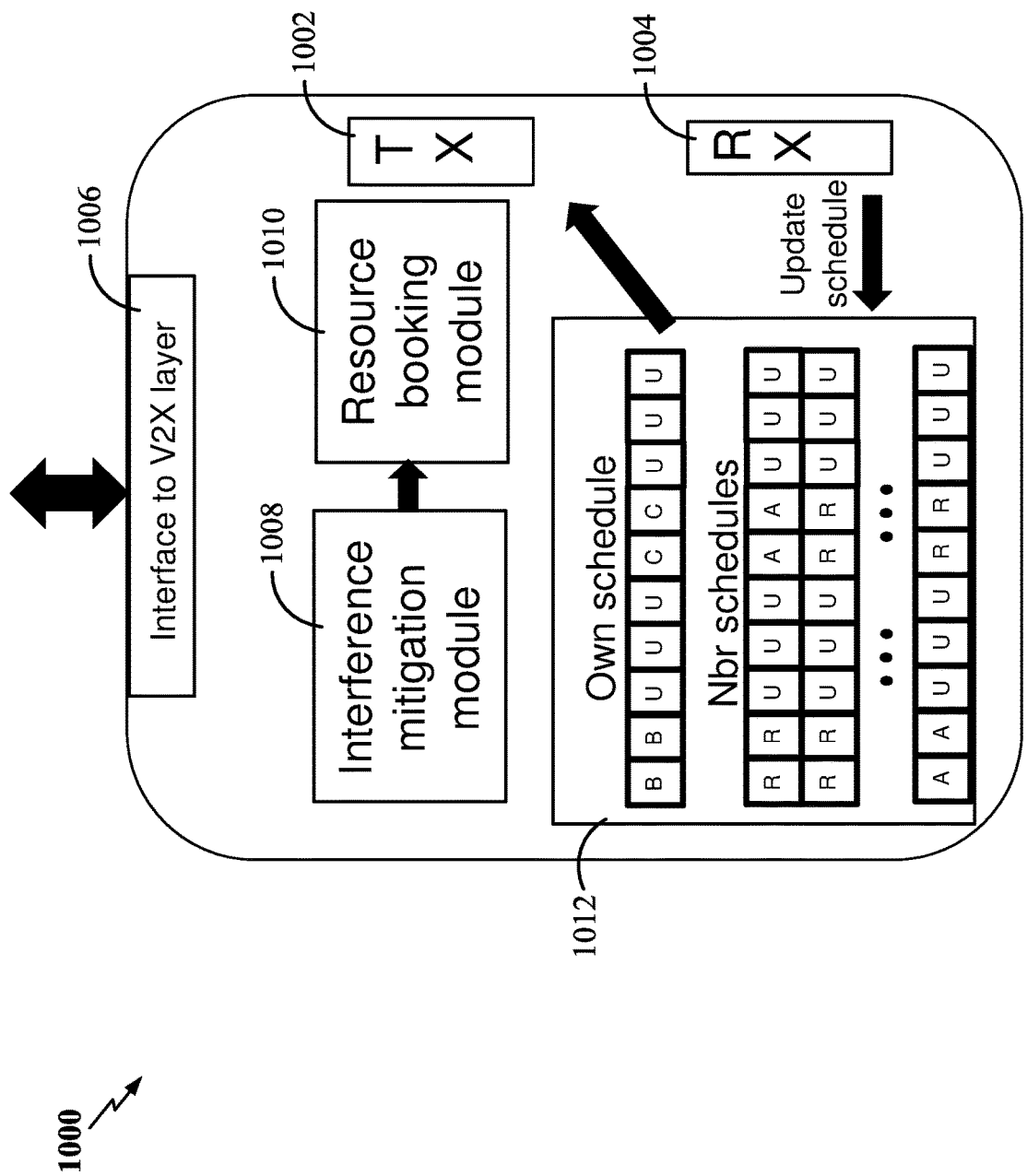
FIG. 10 illustrates an example operation model for a V2X UE.

FIG. 10 illustrates an example operation model for a V2X UE 1000. The UE 1000 may include a transmitter 1002, a receiver 1004, and an interface 1006 that connects to a V2X layer. The UE 1000 may further include an interference mitigation module 1008, a resource booking module 1010, and a storage 1012 for storing the UE's own slow-loop booking schedule as well as neighboring UEs' slow-loop booking schedules. In an aspect, V2X traffic data that may need to be communicated may be transferred to and from the V2X layer via the interface 1006. The interference mitigation module 1008 may be configured to detect collisions and interference. The resource booking module 1010 may be configured to generate a slow-loop booking schedule and conduct data transmission/reception based on the UE's booking schedule as well as neighboring UEs' booking schedules.

In an aspect, the UE 1000 may send various types of information to neighboring UEs via the transmitter 1002. For example, the UE 1000 may send, via the transmitter 1002, a schedule update message (SCH_UPDATE) or a request/response message (REQ/RSP) per link regarding its own schedule (slow-loop booking schedule). The UE 1000 may also send, via the transmitter 1002, other L2 control messages per link (e.g., keep_alive message, beam refining message, etc.). The UE 1000 may further send, via the transmitter 1002, a V2X message per link.

In a further aspect the UE 1000 may receive various types of information from neighboring UEs via the receiver 1004. For example, the UE 1000 may receive, via the receiver 1004, a schedule update message (SCH_UPDATE) or a request/response message (REQ/RSP) per link regarding a neighbor UE's slow-loop booking schedule. The UE 1000 may also receive, via the receiver 1004, other L2 control messages per link (e.g., keep_alive message, beam refining message, etc.). The UE 1000 may further receive, via the receiver 1004, a V2X Message per link and other signals/interferences.

In an aspect of the disclosure, control messages may be provided to facilitate slow-loop booking. A UE may not be able to arbitrarily book slots with another UE because schedules may conflict. For example, a peer UE may have already reserved slot bookings with other peers via other links. Accordingly, a request/response (REQ/RSP) message may be needed to negotiate a booking. Here, an initiator UE may propose (request) a transmission schedule based on traffic demand and a target UE may accept the request or reject the request (e.g., by proposing an alternative schedule). A UE may adjust its slot usage with a new request (REQ) message if the traffic demand changes or if the UE needs to accommodate more peer links. In an aspect, a master-slave relationship between the initiator UE and the target UE may be established to facilitate the slow-loop booking schedule negotiation. For example, the master-slave relationship may ensure that one of the two UEs is enabled to make decisions in case the two UEs cannot come to an agreement. In an aspect, the control messages may be sent via access stratum (AS) layer signaling (e.g., RRC) defined over a NR sidelink.

In an aspect of the disclosure, slow-loop booking may include updating a schedule with a peer node (peer UE). To help a UE create a proper booking request, the UE may exchange a slow-loop booking schedule with peer UEs. For example, the UE may share its slow-loop booking schedule with peer UEs in every (unicast) link (e.g., via a SCH_UPDATE message). The schedule may be periodically updated among connected UEs via directional beams A UE may identify eligible/ineligible resources for communication in a directional (or bi-directional) beam. Moreover, an on-demand schedule update may be triggered by a new slot scheduling outcome.

In an aspect, contents of the SCH_UPDATE message may mask actual node IDs to protect privacy. For a peer UE, the UE only needs to use a reserved flag "R" in its slow-loop booking schedule to indicate whether a slot is available or already reserved. The UE does not need to show the actual node ID of that peer UE. In an aspect, the SCH_UPDATE message may also indicate beam directions (beam index). Moreover, a quasi-collocated (QCL) mechanism may be used in describing beam usage in schedule sharing control signaling.

Figure 11:
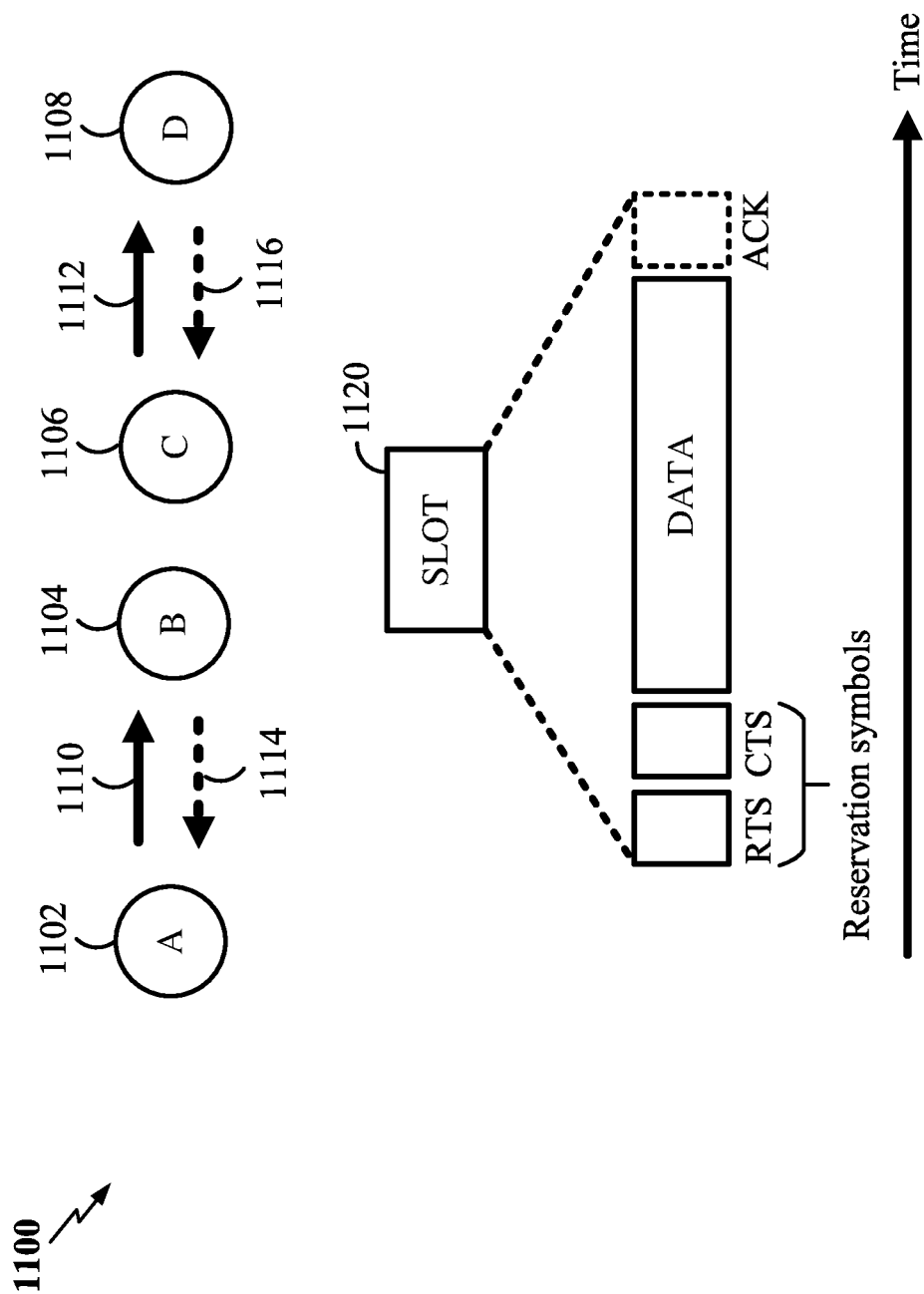
FIG. 11 is a diagram illustrating fast-loop booking to mitigate interference between links.

FIG. 11 is a diagram 1100 illustrating fast-loop booking to mitigate interference between links Referring to FIG. 11, a transmission 1110 from a first node or UE (e.g., node A) 1102 to a second node or UE (e.g., node B) 1104 (A→B) may be in conflict with a transmission 1112 from a third node or UE (e.g., node C) 1106 to a fourth node or UE (e.g., node D) 1108 (C→D). Moreover, a transmission 1114 from the second node (node B) 1104 to the first node (node A) 1102 (B→A) may be in conflict with a transmission 1116 from the fourth node (node D) 1108 to the third node (node C) 1106 (D→C). No conflict exists for other combinations. As such, request-to-send (RTS) and clear-to-send (CTS) messages may be used to determine which conflicting (if any) schedule should be adopted (i.e., determine which node or UE can transmit).

In an example, both the first node (node A) 1102 and the third node (node C) 1106 may desire to transmit, and the third node (node C) 1106 has a higher priority. The first node (node A) 1102 and the third node (node C) 1106 may send RTS messages on corresponding resources within a slot 1120, which both the second node (node B) 1104 and the fourth node (node D) 1108 monitor. The second node (node B) 1104 may receive the node A's RTS message, and likely does not receive the node C's RTS message due to directionality. The second node (node B) 1104 may then send a CTS message on a corresponding resource. The fourth node (node D) 1108 may receive an RTS message from both the first node (node A) 1102 and the third node (node C) 1106. The fourth node (node D) 1108 may further determine from each received RTS message that communication with the third node (node C) 1106 has a higher priority than the communication between the first node (node A) 1102 and the second node (node B) 1104. Accordingly, the fourth node (node D) 1108 may send a CTS message on a corresponding resource, wherein the CTS message is power-controlled based on an inverse of a power associated with the received RTS message from the third node (node C) 1106.

The first node (node A) 1102 may receive the node D's CTS message and determine that the fourth node (node D) 1108 has a higher priority (e.g., CTS message may carry priority indication). Based on the received power of the node D's CTS message, the first node (node A) 1102 may further determine that its transmission will cause large interference on the fourth node (node D) 1108 (i.e., node D's signal-to-interference-plus-noise ratio is less than a threshold (SINR<threshold)). Accordingly, the first node (node A) 1102 may yield and not transmit to the second node (node B) 1104. The third node (node C) 1106 may also receive the node D's CTS, and as a result, may transmit data to the fourth node (node D) 1108 via an upcoming corresponding resource.

Figure 12:
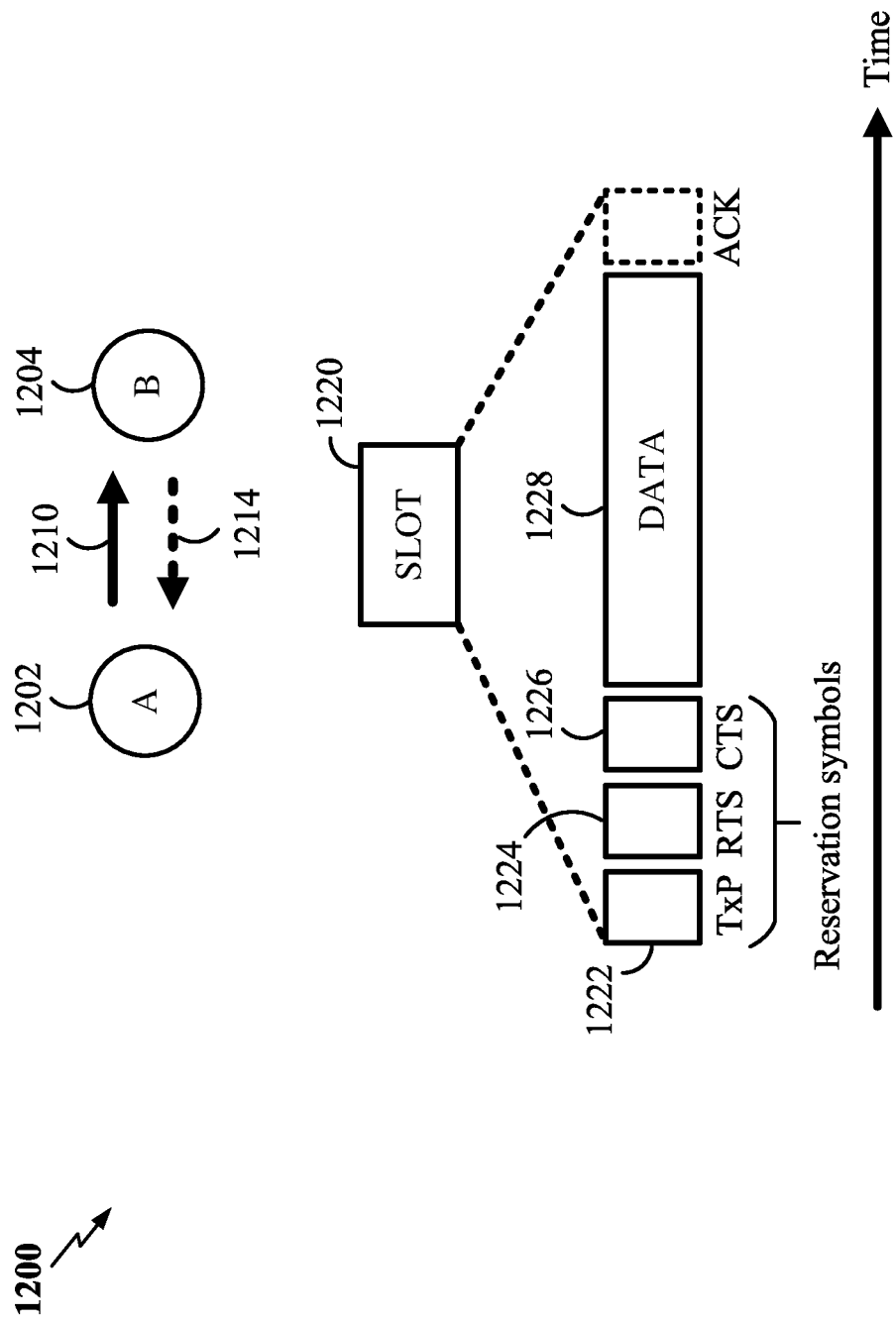
FIG. 12 is a diagram illustrating fast-loop booking to mitigate self-conflict.

FIG. 12 is a diagram 1200 illustrating fast-loop booking to mitigate self-conflict. Referring to FIG. 12, a slot 1220 may be allocated (reserved through slow-loop booking) for communication between a first node (node A) 1202 and a second node (node B) 1204. However, a direction of transmission (i.e., whether the first node 1202 performs a transmission 1210 or the second node 1204 performs a transmission 1214) may not be set a priori. Therefore, a conflict may occur if both the first node (node A) 1202 and the second node (node B) 1204 have information to transmit. A third signal, such as transmission priority (TxP) signal 1222 may be needed to resolve the conflict.

In an aspect, there may be a hierarchy between the first node (node A) 1202 and the second node (node B) 1204. For example, the first node 1202 may be a master and the second node 1204 may be a slave. Such relationship may be determined a priori (e.g., when the first node 1202 and the second node 1204 established a first connection or during slow-loop booking). In an aspect, only the master can transmit the TxP signal 1222, and the slave always monitors resources on which the TxP signal is transmitted.

If the first node 1202 has data to transmit in upcoming corresponding resources, the first node 1202 transmits the TxP signal 1222, and the second node 1204 receives the TxP signal 1222. Notably, in this case, the first node 1202 may or may not transmit a RTS message 1224. If the second node 1204 also has data to transmit, the second node 1204 will not transmit a RTS message 1224 upon receiving the TxP signal 1222. The second node 1204 may, however, send a CTS message 1226 based on measurements performed by the second node 1204, other transmissions, priorities, etc. Accordingly, if the first node 1202 receives the CTS message 1226 from the second node 1204, the first node 1202 may transmit the data 1228 to the second node 1204 (i.e., perform the transmission 1210).

If the first node 1202 does not have data to transmit, the first node 1202 does not send the TxP signal 1222. Rather, the first node 1202 monitors the resources on which RTS messages are transmitted in case the second node 1204 transmits a RTS message 1224. If the second node 1204 has data to transmit, the second node 1204 transmits the RTS message 1224 and monitors resources on which CTS messages are transmitted for a CTS message 1226 from the first node 1202. Accordingly, if the second node 1204 receives the CTS message 1226 from the first node 1202, the second node 1204 may transmit the data 1228 to the first node 1202 (i.e., perform the transmission 1214).

A signal design of the transmission priority (TxP) signal will now be described. In an aspect, the TxP signal may have a reference sequence design, similar to a RTS signal or a CTS signal. For example, the TxP signal can be based on a pseudo-noise sequence, an m-sequence, a Zadoff-Chu sequence, or the like. In this case, a data transmission following the transmission of the TxP signal may be accompanied by a control transmission that provides required resource/configuration information for the data transmission.

In another aspect, the TxP signal may have a physical channel design. For example, the TxP signal may have a control channel design that encodes a control payload (e.g., a physical downlink control channel (PDCCH) or a shared control channel (SCCH)). Accordingly, a transmission of the TxP signal may be accompanied (multiplexed) with a reference signal (e.g., demodulation reference signal (DMRS), phase-noise tracking reference signal (PTRS), beam-reference signal, etc.) that can be used for the reception and processing of the control channel (providing required resource/configuration information for a data transmission). In this case, there may not be any further control transmission before the data transmission (data channel), if sufficient resource/configuration information is provided in the TxP signal. Otherwise, if the TxP signal does not provide all of the required information, a control channel carrying remaining resource/configuration information may be transmitted.

A bandwidth of the TxP signal will now be described. In an aspect, the TxP signal may occupy at least a same bandwidth as a RTS signal, a CTS signal, and/or a data payload. The TxP signal may occupy a wider bandwidth. In this case, if a UE sends the TxP signal, the UE may or may not sent the RTS signal.

In another aspect, the bandwidth occupied by the RTS signal, the CTS signal, and/or the data payload partially overlaps with the bandwidth occupied by the TxP signal. For example, the bandwidth occupied by the TxP signal may be narrower than the bandwidth occupied by the RTS signal, the CTS signal, and/or the data payload. In another example, the bandwidth occupied by the TxP signal may be wider (or the same as), but does not fully cover, the bandwidth occupied by the RTS signal, the CTS signal, and/or the data payload. In this case, if a UE sends the TxP signal, the UE may also send the RTS signal on corresponding resources so that a reliable measurement can be provided for monitoring UEs.

Information carried by the TxP signal will now be described. In an aspect, the TxP signal may carry various types of information. For example, the TxP signal may carry a transmitter identity, a receiver identity, and/or an identity of a transmitter-receiver pair. Moreover, the TxP signal may carry a priority of a data transmission corresponding to the TxP signal. The TxP signal may carry an indication of the resources (e.g., number of slots) needed for the data transmission that a UE wants to reserve. The TxP signal may further carry any part or all of the resources and configurations for an upcoming communication (e.g. RTS, CTS, data, acknowledgement (ACK), etc.). This may also include a modulation and coding scheme (MCS), power control configuration, HARQ related information, quasi-collocated (QCL) information, etc. Notably, if the TxP signal is based on a reference sequence, limited information may be carried, while a channel-based design for the TxP signal may carry more information.

A way in which information is carried by the TxP signal will now be described. In an aspect, if the TxP signal is designed based on a reference sequence, the information in the TxP signal may be carried via different root IDs used to generate the reference sequence or a scrambling sequence. Additionally or alternatively, the information may be carried via different cyclic shifts of a base sequence used to generate the reference sequence. Additionally or alternatively, the information may be carried via a frequency location of the occupied resources (e.g., which subset of tones are used for the TxP signal transmission). Additionally or alternatively, the information may be carried via a time location of the occupied resources (in case there are multiple time-domain resources for the transmission of the TxP signal).

In another aspect, if the TxP signal has a channel-based design, the information in the TxP signal may be carried via a payload of the physical channel. Additionally or alternatively, the information may be carried via an accompanying reference signal. Additionally or alternatively, the information may be carried via time-domain or frequency-domain resources used for the transmission of a channel and/or a reference signal.

Beamforming of the TxP signal will now be described. In an aspect, the TxP signal may be transmitted using the same antenna port used for transmitting the RTS signal and/or a data payload. In this case, the same beam may be used for transmitting all of such signals.

In another aspect, the TxP signal may be quasi-collocated (QCL) with the RTS and/or the data payload with respect to different parameters (e.g., average delay, delay spread, Doppler, Doppler spread, spatial parameters). In this case, the same beam may be used to transmit all of such signals when the signals are spatially quasi-collocated. However, a different beam (e.g., a wider beam) may be used to transmit the TxP signal than the other signals.

Figure 13:
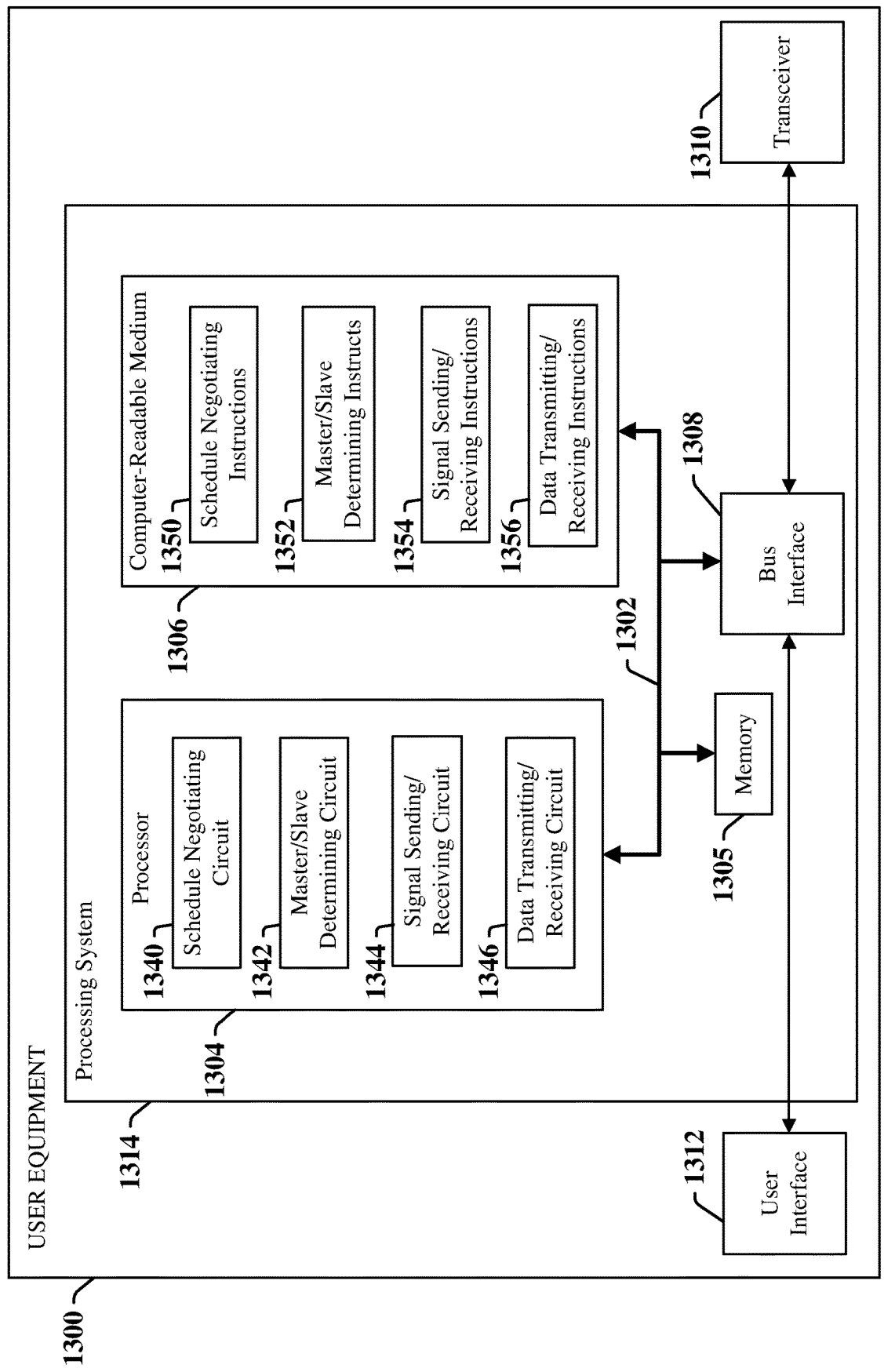
FIG. 13 is a block diagram illustrating an example of a hardware implementation for a user equipment (UE) or apparatus employing a processing system in accordance with some aspects of the disclosure.

FIG. 13 is a block diagram illustrating an example of a hardware implementation for a user equipment (UE) or apparatus 1300 employing a processing system 1314. For example, the apparatus 1300 may be a user equipment (UE) as illustrated in any one or more of FIGS. 1, 2, 3, 7, and/or 10.

The UE 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described below and illustrated in FIGS. 14 and 15.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided. Of course, such a user interface 1312 is optional, and may be omitted in some examples, such as a base station.

In some aspects of the disclosure, the processor 1304 may include schedule negotiating circuitry 1340 configured for various functions, including, for example, negotiating with a receiver/transmitter to reserve a slot for communicating data with the receiver/transmitter. For example, the schedule negotiating circuitry 1340 may be configured to implement one or more of the functions described below in relation to FIG. 14, including, e.g., block 1402, and in relation to FIG. 15, including, e.g., block 1502. The processor 1304 may include master/slave determining circuitry 1342 configured for various functions, including, for example, determining whether the transmitter/receiver is a master or a slave with respect to the receiver/transmitter. For example, the master/slave determining circuitry 1342 may be configured to implement one or more of the functions described below in relation to FIG. 14, including, e.g., block 1404, and in relation to FIG. 15, including, e.g., block 1504. The processor 1304 may include signal sending/receiving circuitry 1344 configured for various functions, including, for example, sending/receiving (or refraining from sending/receiving) a transmission priority (TxP) signal, a request-to-send (RTS) message, and/or a clear-to-send (CTS) message. For example, the signal sending/receiving circuitry 1344 may be configured to implement one or more of the functions described below in relation to FIG. 14, including, e.g., blocks 1406, 1408, 1410, and 1412, and in relation to FIG. 15, including, e.g., blocks 1506, 1508, 1510, and 1512. The processor 1304 may include data transmitting/receiving circuitry 1346 configured for various functions, including, for example, transmitting/receiving the data in the slot based on the CTS message. For example, the data transmitting/receiving circuitry 1346 may be configured to implement one or more of the functions described below in relation to FIG. 14, including, e.g., block 1414, and in relation to FIG. 15, including, e.g., block 1514.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable medium 1306 may include schedule negotiating instructions 1350 configured for various functions, including, for example, negotiating with a receiver/transmitter to reserve a slot for communicating data with the receiver/transmitter. For example, the schedule negotiating instructions 1350 may be configured to implement one or more of the functions described below in relation to FIG. 14, including, e.g., block 1402, and in relation to FIG. 15, including, e.g., block 1502. The computer-readable medium 1306 may include master/slave determining instructions 1352 configured for various functions, including, for example, determining whether the transmitter/receiver is a master or a slave with respect to the receiver/transmitter. For example, the master/slave determining instructions 1352 may be configured to implement one or more of the functions described below in relation to FIG. 14, including, e.g., block 1404, and in relation to FIG. 15, including, e.g., block 1504. The computer-readable medium 1306 may include signal sending/receiving instructions 1354 configured for various functions, including, for example, sending/receiving (or refraining from sending/receiving) a transmission priority (TxP) signal, a request-to-send (RTS) message, and/or a clear-to-send (CTS) message. For example, the signal sending/receiving instructions 1354 may be configured to implement one or more of the functions described below in relation to FIG. 14, including, e.g., blocks 1406, 1408, 1410, and 1412, and in relation to FIG. 15, including, e.g., blocks 1506, 1508, 1510, and 1512. The computer-readable medium 1306 may include data transmitting/receiving instructions 1356 configured for various functions, including, for example, transmitting/receiving the data in the slot based on the CTS message. For example, the data transmitting/receiving instructions 1356 may be configured to implement one or more of the functions described below in relation to FIG. 14, including, e.g., block 1414, and in relation to FIG. 15, including, e.g., block 1514.

Figure 14:
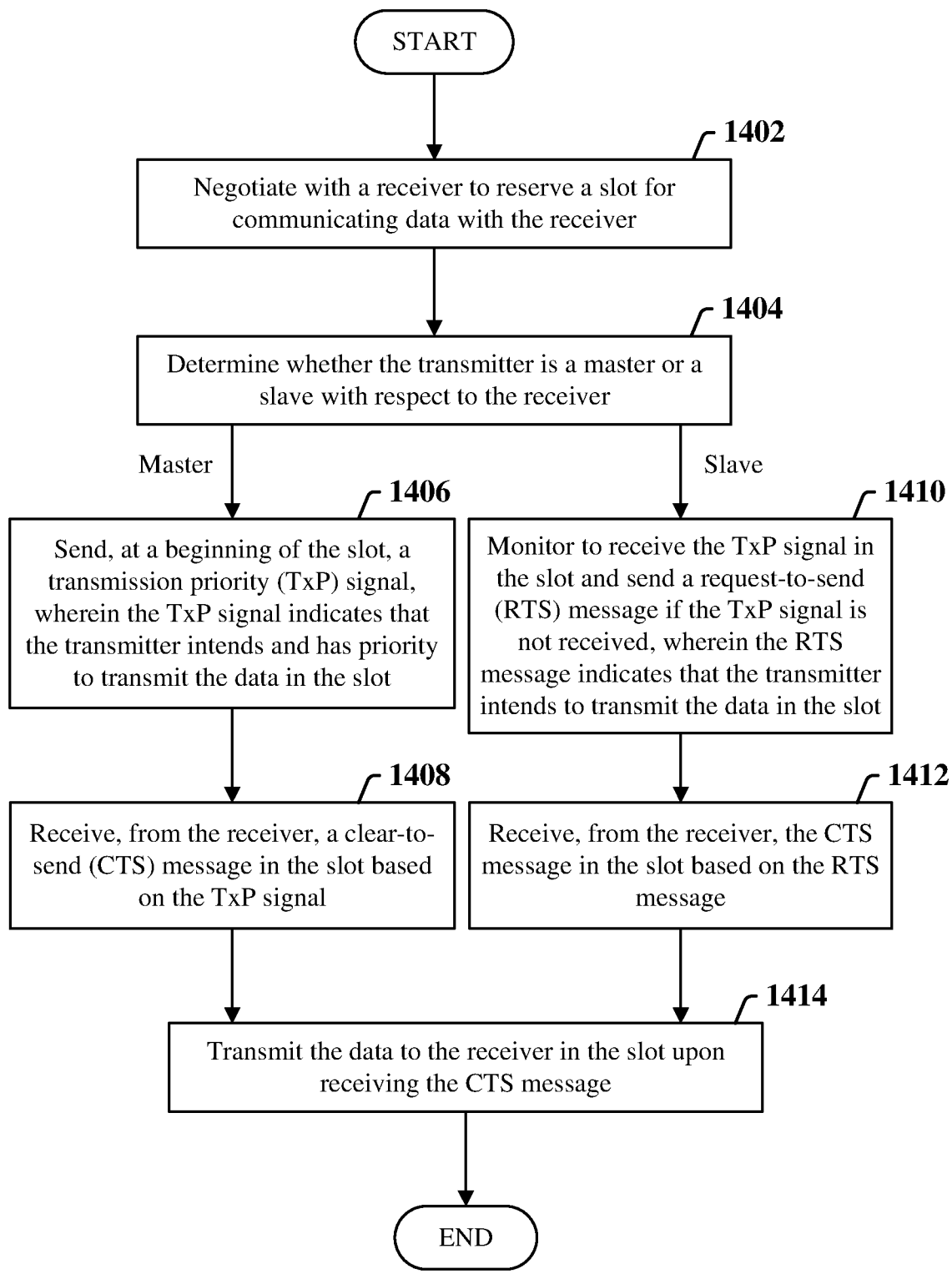
FIG. 14 is a flow chart illustrating an exemplary process for scheduling traffic between a transmitter and a receiver in accordance with some aspects of the disclosure.

FIG. 14 is a flow chart illustrating an exemplary process 1400 for scheduling traffic between a transmitter (transmitting device) and a receiver (receiving device) in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the user equipment 1300 illustrated in FIG. 13 acting as a transmitter (transmitting device). In some examples, the process 1400 may be carried out by any suitable apparatus or means for carrying out the functions or algorithm described below.

At block 1402, a transmitter negotiates with a receiver to reserve a slot for communicating data with the receiver (e.g., slow-loop booking).

At block 1404, the transmitter determines whether the transmitter is a master or a slave with respect to the receiver. For example, such relationship may be determined when the transmitter and receiver first established a connection or during slow-loop booking.

If the transmitter is the master, at block 1406, the transmitter sends, at a beginning of the slot, a transmission priority (TxP) signal. The TxP signal indicates that the transmitter intends and has priority to transmit the data in the slot. In an aspect, the transmitter may further send a request-to-send (RTS) message after sending the TxP signal. The RTS message further indicates that the transmitter intends to transmit the data in the slot. At block 1408, the transmitter may receive, from the receiver, a clear-to-send (CTS) message in the slot based on the TxP signal. If the RTS message is sent, the CTS message may be received further based on the RTS message.

If the transmitter is the slave, at block 1410, the transmitter monitors to receive the TxP signal in the slot. If the TxP signal is not received, the transmitter sends a request-to-send (RTS) message. The RTS message indicates that the transmitter intends to transmit the data in the slot. At block 1412, the transmitter receives, from the receiver, the CTS message in the slot based on the RTS message.

At block 1414, transmitter transmits the data to the receiver in the slot upon receiving the CTS message.

In an aspect, the TxP signal occupies a same bandwidth occupied by the RTS message, the CTS message, and the data. Alternatively, TxP signal occupies a bandwidth that partially overlaps a bandwidth occupied by the RTS message, the CTS message, and the data. In a further aspect, the TxP signal, the RTS message, and the data may be transmitted via a same beam.

In an aspect, the TxP signal is a reference sequence or a physical channel. If the TxP signal is the reference sequence, information in the TxP signal may be carried via different root IDs used to generate the reference sequence or a scrambling sequence, different cyclic shifts of a base sequence used to generate the reference sequence, a frequency location of occupied resources, and/or a time location of the occupied resources. If the TxP signal is the physical channel, information in the TxP signal may be carried via a payload of the physical channel, an accompanying reference signal, and/or time-division resources or frequency-domain resources used for transmitting a channel or a reference signal.

In a further aspect, information carried in the TxP signal may include a transmitter identity, a receiver identity, an identity of a transmitter-receiver pair, a priority of the data to be transmitted corresponding to the TxP signal, an indication of resources for transmitting the data, and/or resource and configuration information for an upcoming communication.

In one configuration, the apparatus 1300 for wireless communication includes means for negotiating with a receiver to reserve a slot for communicating data with the receiver; means for determining whether the transmitter is a master or a slave with respect to the receiver; if the transmitter is the master: means for sending, at a beginning of the slot, a transmission priority (TxP) signal, wherein the TxP signal indicates that the transmitter intends and has priority to transmit the data in the slot, and means for receiving, from the receiver, a clear-to-send (CTS) message in the slot based on the TxP signal; if the transmitter is the slave: means for monitoring to receive the TxP signal in the slot, means for sending a request-to-send (RTS) message if the TxP signal is not received, wherein the RTS message indicates that the transmitter intends to transmit the data in the slot, and means for receiving, from the receiver, the CTS message in the slot based on the RTS message; and means for transmitting the data to the receiver in the slot upon receiving the CTS message. In one aspect, the aforementioned means may be the processor(s) 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one of the FIGS. 1, 2, 3, 7, and/or 10, and utilizing, for example, the processes and/or algorithms described herein in relation to FIG. 14.

Figure 15:
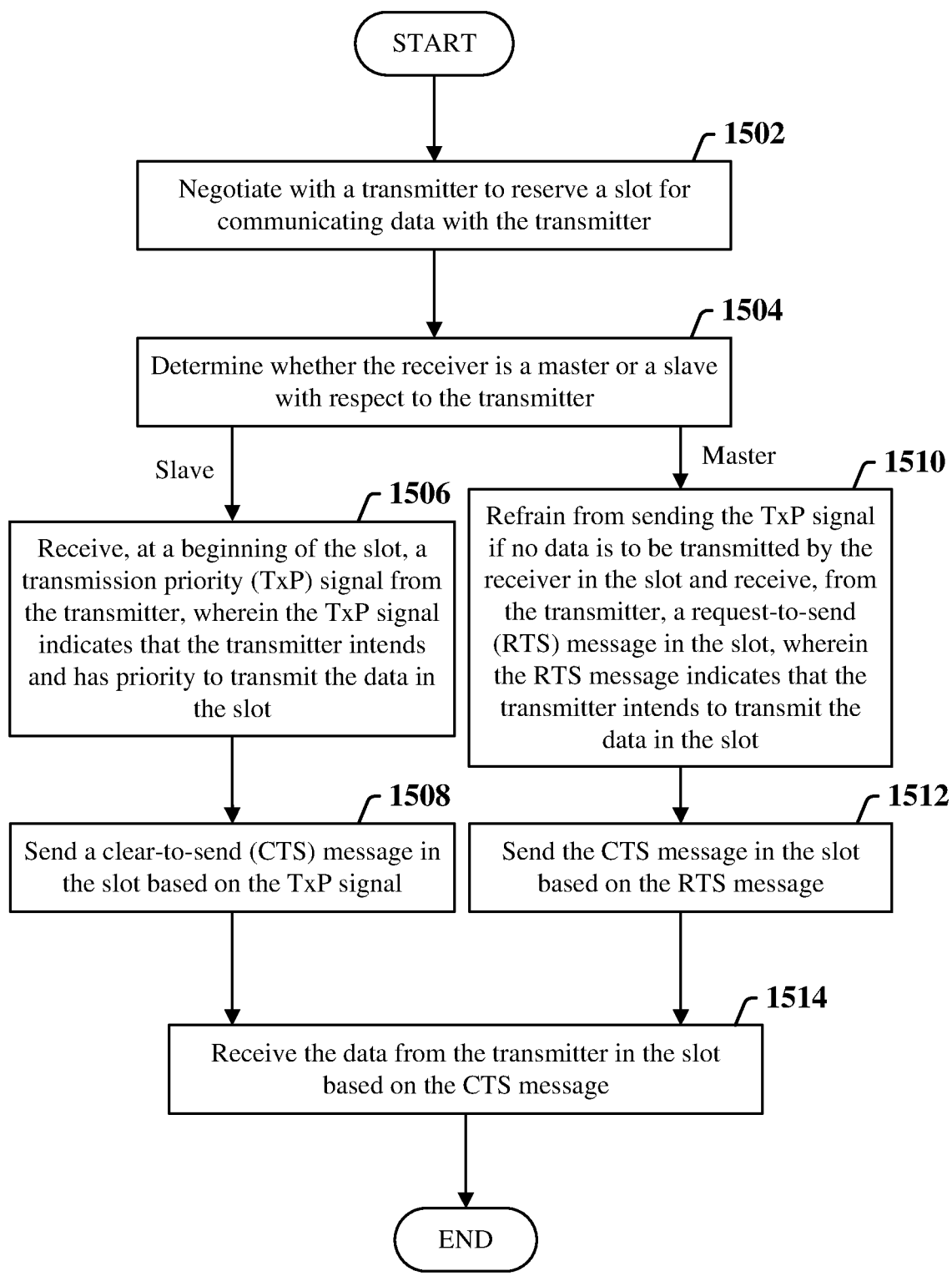
FIG. 15 is a flow chart illustrating another exemplary process for scheduling traffic between a transmitter and a receiver in accordance with some aspects of the disclosure.

FIG. 15 is a flow chart illustrating an exemplary process 1500 for scheduling traffic between a transmitter (transmitting device) and a receiver (receiving device) in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the user equipment 1300 illustrated in FIG. 13 acting as a receiver (receiving device). In some examples, the process 1500 may be carried out by any suitable apparatus or means for carrying out the functions or algorithm described below.

At block 1502, a receiver negotiates with a transmitter to reserve a slot for communicating data with the transmitter (e.g. slow-loop booking).

At block 1504, the receiver determines whether the receiver is a master or a slave with respect to the transmitter. For example, such relationship may be determined when the transmitter and receiver first established a connection or during slow-loop booking.

If the receiver is the slave, at block 1506, the receiver receives, at a beginning of the slot, a transmission priority (TxP) signal from the transmitter. The TxP signal indicates that the transmitter intends and has priority to transmit the data in the slot. In an aspect, the receiver may further receive a request-to-send (RTS) message after receiving the TxP signal. The RTS message further indicates that the transmitter intends to transmit the data in the slot. At block 1508, the receiver may send a clear-to-send (CTS) message in the slot based on the TxP signal. If the RTS message is received, the CTS message may be sent further based on the RTS message. In a further aspect, the receiver may refrain from sending its own RTS message in the slot after receiving the TxP signal.

If the receiver is the master, at block 1510, the receiver may refrain from sending the TxP signal if no data is to be transmitted by the receiver in the slot and receive, from the transmitter, a request-to-send (RTS) message in the slot. The RTS message indicates that the transmitter intends to transmit the data in the slot. At block 1512, the receiver sends the CTS message in the slot based on the RTS message.

At block 1514, the receiver receiving the data from the transmitter in the slot based on the CTS message.

In an aspect, the TxP signal occupies a same bandwidth occupied by the RTS message, the CTS message, and the data. Alternatively, the TxP signal occupies a bandwidth that partially overlaps a bandwidth occupied by the RTS message, the CTS message, and the data. In a further aspect, the TxP signal, the RTS message, and the data may be received via a same beam.

In an aspect, the TxP signal is a reference sequence or a physical channel. If the TxP signal is the reference sequence, information in the TxP signal is carried via different root IDs used to generate the reference sequence or a scrambling sequence, different cyclic shifts of a base sequence used to generate the reference sequence, a frequency location of occupied resources, and/or a time location of the occupied resources. If the TxP signal is the physical channel, information in the TxP signal is carried via a payload of the physical channel, an accompanying reference signal, and/or time-domain resources or frequency-domain resources used for transmitting a channel or a reference signal.

In a further aspect, information carried in the TxP signal may include a transmitter identity, a receiver identity, an identity of a transmitter-receiver pair, a priority of the data to be transmitted corresponding to the TxP signal, an indication of resources for receiving the data, and/or resource and configuration information for an upcoming communication.

In one configuration, the apparatus 1300 for wireless communication includes means for negotiating with a transmitter to reserve a slot for communicating data with the transmitter; means for determining whether the receiver is a master or a slave with respect to the transmitter; if the receiver is the slave: means for receiving, at a beginning of the slot, a transmission priority (TxP) signal from the transmitter, wherein the TxP signal indicates that the transmitter intends and has priority to transmit the data in the slot, and means for sending a clear-to-send (CTS) message in the slot based on the TxP signal; means for refraining from sending a request-to-send (RTS) message after receiving the TxP signal; if the receiver is the master: means for refraining from sending the TxP signal if no data is to be transmitted by the receiver in the slot, means for receiving, from the transmitter, a request-to-send (RTS) message in the slot, wherein the RTS message indicates that the transmitter intends to transmit the data in the slot, and means for sending the CTS message in the slot based on the RTS message; and means for receiving the data from the transmitter in the slot based on the CTS message. In one aspect, the aforementioned means may be the processor(s) 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one of the FIGS. 1, 2, 3, 7, and/or 10, and utilizing, for example, the processes and/or algorithms described herein in relation to FIG. 15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method performed at a transmitting device for scheduling traffic with a receiving device, comprising:
   negotiating with a receiving device to reserve a slot for communicating data with the receiving device;
   determining whether the transmitting device is a master or a slave with respect to the receiving device;
   if the transmitting device is the master:
      sending, at a beginning of the slot, a transmission priority (TxP) signal, wherein the TxP signal indicates that the transmitting device intends and has priority to transmit the data in the slot,
      sending a request-to-send (RTS) message after sending the TxP signal, wherein the RTS message further indicates that the transmitting device intends to transmit the data in the slot, and
      receiving, from the receiving device, a clear-to-send (CTS) message in the slot in response to at least the RTS message; and
   transmitting the data to the receiving device in the slot upon receiving the CTS message,
   wherein the TxP signal, the RTS message, and the data are transmitted via a same beam.

2. The method of claim 1, wherein the CTS message is received further in response to the TxP signal.

3. The method of claim 2, wherein the TxP signal occupies at least one of:
   a same bandwidth occupied by the RTS message, the CTS message, and the data; or
   a bandwidth that partially overlaps a bandwidth occupied by the RTS message, the CTS message, and the data.

4. The method of claim 1, wherein if the transmitting device is the slave, the method further comprises:
   monitoring to receive the TxP signal in the slot;
   sending a request-to-send (RTS) message if the TxP signal is not received, wherein the RTS message indicates that the transmitting device intends to transmit the data in the slot; and
   receiving, from the receiving device, the CTS message in the slot in response to the RTS message.

5. The method of claim 1, wherein the TxP signal is a reference sequence and information in the TxP signal is carried via at least one of:
   different root IDs used to generate the reference sequence or a scrambling sequence;
   different cyclic shifts of a base sequence used to generate the reference sequence;
   a frequency location of occupied resources; or
   a time location of the occupied resources.

6. The method of claim 1, wherein the TxP signal is a physical channel and information in the TxP signal is carried via at least one of:
   a payload of the physical channel;
   an accompanying reference signal; or
   time-domain resources or frequency-domain resources used for transmitting a channel or a reference signal.

7. The method of claim 1, wherein the TxP signal includes at least one of:
   a transmitter identity;
   a receiver identity;
   an identity of a transmitter-receiver pair;
   a priority of the data to be transmitted corresponding to the TxP signal;
   an indication of resources for transmitting the data; or
   resource and configuration information for an upcoming communication.

8. A transmitting device for scheduling traffic with a receiving device, comprising:
   means for negotiating with a receiving device to reserve a slot for communicating data with the receiving device;
   means for determining whether the transmitting device is a master or a slave with respect to the receiving device;
   if the transmitting device is the master:
      means for sending, at a beginning of the slot, a transmission priority (TxP) signal, wherein the TxP signal indicates that the transmitting device intends and has priority to transmit the data in the slot,
      means for sending a request-to-send (RTS) message after sending the TxP signal, wherein the RTS message further indicates that the transmitting device intends to transmit the data in the slot, and
      means for receiving, from the receiving device, a clear-to-send (CTS) message in the slot in response to at least the RTS message; and
   means for transmitting the data to the receiving device in the slot upon receiving the CTS message,
   wherein the TxP signal, the RTS message, and the data are transmitted via a same beam.

9. The transmitting device of claim 8, wherein the CTS message is received further in response to the TxP signal.

10. The transmitting device of claim 9, wherein the TxP signal occupies at least one of:
    a same bandwidth occupied by the RTS message, the CTS message, and the data; or
    a bandwidth that partially overlaps a bandwidth occupied by the RTS message, the CTS message, and the data.

11. The transmitting device of claim 8, wherein if the transmitting device is the slave, the transmitting device further comprises:
    means for monitoring to receive the TxP signal in the slot;
    means for sending a request-to-send (RTS) message if the TxP signal is not received, wherein the RTS message indicates that the transmitting device intends to transmit the data in the slot; and
    means for receiving, from the receiving device, the CTS message in the slot in response to the RTS message.

12. The transmitting device of claim 8, wherein the TxP signal is a reference sequence and information in the TxP signal is carried via at least one of:
    different root IDs used to generate the reference sequence or a scrambling sequence;

different cyclic shifts of a base sequence used to generate the reference sequence;
a frequency location of occupied resources; or
a time location of the occupied resources.

13. The transmitting device of claim 8, wherein the TxP signal is a physical channel and information in the TxP signal is carried via at least one of:
a payload of the physical channel;
an accompanying reference signal; or
time-domain resources or frequency-domain resources used for transmitting a channel or a reference signal.

14. A method performed at a receiving device for scheduling traffic with a transmitting device, comprising:
negotiating with a transmitting device to reserve a slot for communicating data with the transmitting device;
determining whether the receiving device is a master or a slave with respect to the transmitting device;
if the receiving device is the slave:
receiving, at a beginning of the slot, a transmission priority (TxP) signal from the transmitting device, wherein the TxP signal indicates that the transmitting device intends and has priority to transmit the data in the slot,
receiving a request-to-send (RTS) message after receiving the TxP signal, wherein the RTS message further indicates that the transmitting device intends to transmit the data in the slot, and
sending a clear-to-send (CTS) message in the slot in response to at least the RTS message; and
receiving the data from the transmitting device in the slot in response to the CTS message,
wherein the TxP signal, the RTS message, and the data are received via a same beam.

15. The method of claim 14, wherein the CTS message is sent further in response to the TxP signal.

16. The method of claim 15, wherein the TxP signal occupies at least one of:
a same bandwidth occupied by the RTS message, the CTS message, and the data; or
a bandwidth that partially overlaps a bandwidth occupied by the RTS message, the CTS message, and the data.

17. The method of claim 14, further comprising refraining from sending a request-to-send (RTS) message in the slot after receiving the TxP signal.

18. The method of claim 14, wherein if the receiving device is the master, the method further comprises:
refraining from sending the TxP signal if no data is to be transmitted by the receiving device in the slot;
receiving, from the transmitting device, a request-to-send (RTS) message in the slot, wherein the RTS message indicates that the transmitting device intends to transmit the data in the slot; and
sending the CTS message in the slot in response to the RTS message.

19. The method of claim 14, wherein the TxP signal is a reference sequence and information in the TxP signal is carried via at least one of:
different root IDs used to generate the reference sequence or a scrambling sequence;
different cyclic shifts of a base sequence used to generate the reference sequence;
a frequency location of occupied resources; or
a time location of the occupied resources.

20. The method of claim 14, wherein the TxP signal is a physical channel and information in the TxP signal is carried via at least one of:
a payload of the physical channel;
an accompanying reference signal; or
time-domain resources or frequency-domain resources used for transmitting a channel or a reference signal.

21. The method of claim 14, wherein the TxP signal includes at least one of:
a transmitter identity;
a receiver identity;
an identity of a transmitter-receiver pair;
a priority of the data to be transmitted corresponding to the TxP signal;
an indication of resources for receiving the data; or
resource and configuration information for an upcoming communication.

22. A receiving device for scheduling traffic with a transmitting device, comprising:
means for negotiating with a transmitting device to reserve a slot for communicating data with the transmitting device;
means for determining whether the receiving device is a master or a slave with respect to the transmitting device;
if the receiving device is the slave:
means for receiving, at a beginning of the slot, a transmission priority (TxP) signal from the transmitting device, wherein the TxP signal indicates that the transmitting device intends and has priority to transmit the data in the slot
means for receiving a request-to-send (RTS) message after receiving the TxP signal, wherein the RTS message further indicates that the transmitting device intends to transmit the data in the slot, and
means for sending a clear-to-send (CTS) message in the slot in response to at least the RTS message; and
means for receiving the data from the transmitting device in the slot in response to the CTS message,
wherein the TxP signal, the RTS message, and the data are received via a same beam.

23. The receiving device of claim 22, wherein the CTS message is sent further in response to the TxP signal.

24. The receiving device of claim 22, further comprising means for refraining from sending a request-to-send (RTS) message after receiving the TxP signal.

25. The receiving device of claim 22, wherein if the receiving device is the master, the receiving device further comprises:
means for refraining from sending the TxP signal if no data is to be transmitted by the receiving device in the slot;
means for receiving, from the transmitting device, a request-to-send (RTS) message in the slot, wherein the RTS message indicates that the transmitting device intends to transmit the data in the slot; and
means for sending the CTS message in the slot in response to the RTS message.

26. The receiving device of claim 22, wherein the TxP signal is a reference sequence and information in the TxP signal is carried via at least one of:
different root IDs used to generate the reference sequence or a scrambling sequence;
different cyclic shifts of a base sequence used to generate the reference sequence;
a frequency location of occupied resources; or
a time location of the occupied resources.

27. The receiving device of claim 22, wherein the TxP signal is a physical channel and information in the TxP signal is carried via at least one of:
- a payload of the physical channel;
- an accompanying reference signal; or
- time-domain resources or frequency-domain resources used for transmitting a channel or a reference signal.

\* \* \* \* \*